(12) United States Patent
Simon et al.

(10) Patent No.: US 8,693,507 B2
(45) Date of Patent: Apr. 8, 2014

(54) APPARATUS, SYSTEMS, METHODS AND COMPUTER PROGRAM PRODUCTS FOR PRODUCING A SINGLE FREQUENCY NETWORK FOR ATSC MOBILE / HANDHELD SERVICES

(75) Inventors: Michael Simon, Frederick, MD (US); Michael Kramer, Dillishausen (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 450 days.

(21) Appl. No.: 13/086,095

(22) Filed: Apr. 13, 2011

(65) Prior Publication Data

US 2011/0188521 A1    Aug. 4, 2011

Related U.S. Application Data

(62) Division of application No. 12/491,305, filed on Jun. 25, 2009, now Pat. No. 8,355,458.

(60) Provisional application No. 61/075,523, filed on Jun. 25, 2008, provisional application No. 61/111,761, filed on Nov. 6, 2008.

(51) Int. Cl.
*H04L 27/28*    (2006.01)
*H04J 3/06*    (2006.01)
*H04L 5/12*    (2006.01)
*H04L 23/02*    (2006.01)

(52) U.S. Cl.
USPC ............................ 370/509; 375/260; 375/265

(58) Field of Classification Search
USPC .................................. 370/509; 375/260, 265
See application file for complete search history.

(56) References Cited

U.S. PATENT DOCUMENTS

| 5,216,503 | A | 6/1993 | Paik et al. |
| 5,506,844 | A | 4/1996 | Rao |
| 5,614,914 | A | 3/1997 | Bolgiano et al. |
| 5,835,493 | A | 11/1998 | Magee et al. |
| 5,903,574 | A | 5/1999 | Lyons |
| 5,966,120 | A | 10/1999 | Arazi et al. |
| 6,005,605 | A | 12/1999 | Kostreski et al. |

(Continued)

FOREIGN PATENT DOCUMENTS

| DE | 199 60 295 | 6/2001 |
| DE | 196 17 293 | 11/2001 |

(Continued)

OTHER PUBLICATIONS

"Universal Mobile Telecommunication Systems (UMTS); Introduction of the Multimedia Broadcast/Multicast Service (MBMS) in the Radio Access Network (Ran); Stage 2" (3GPP TS 25.346 version 7.4.0 Release 7); ETSI TS 125 346 No. V7.4.0 (Jun. 2007), IEEE, Lis, Sophia Antipolis Cedex, France, vol. 3-R2, No. V7.4.0, Jun. 1, 2007.
Lee et al., "ATSC Terrestrial Digital Television Broadcasting Using Single Frequency Networks", XP-002556814, ETRI Journal, vol. 26, No. 2, Apr. 2004, pp. 92-100.
"ATSC Digital Television Standard (Annex D), RF/Transmission Systems Characteristics", Advanced Television Systems Committee, Sep. 16, 1995, pp. 46-60.

(Continued)

*Primary Examiner* — Ronald Abelson
(74) *Attorney, Agent, or Firm* — Fitzpatrick, Cella, Harper & Scinto

(57) ABSTRACT

Producing coherent symbols from a plurality of digital RF transmitters is achieved by selecting data bytes corresponding to mobile-handheld encapsulation (MHE) packets and setting trellis coders to a predetermined state when a predetermined number of bits of the data bytes enter a corresponding trellis coder.

18 Claims, 16 Drawing Sheets

(56) References Cited

U.S. PATENT DOCUMENTS

| | | |
|---|---|---|
| 6,088,337 A | 7/2000 | Eastmond et al. |
| 6,118,797 A * | 9/2000 | O'Shea .................. 370/524 |
| 6,130,898 A | 10/2000 | Kostreski et al. |
| 6,192,070 B1 | 2/2001 | Poon et al. |
| 6,269,092 B1 | 7/2001 | Schilling |
| 6,313,885 B1 | 11/2001 | Patel et al. |
| 6,324,186 B1 | 11/2001 | Mahn |
| 6,335,766 B1 | 1/2002 | Twitchell et al. |
| 6,414,720 B1 | 7/2002 | Tsukidate et al. |
| 6,477,180 B1 | 11/2002 | Aggarwal et al. |
| 6,480,236 B1 | 11/2002 | Limberg |
| 6,496,477 B1 | 12/2002 | Perkins et al. |
| 6,507,618 B1 | 1/2003 | Wee et al. |
| 6,631,491 B1 | 10/2003 | Shibutani et al. |
| 6,640,239 B1 | 10/2003 | Gidwani |
| 6,678,260 B2 | 1/2004 | Proctor, Jr. |
| 6,721,337 B1 | 4/2004 | Kroeger et al. |
| 6,727,847 B2 | 4/2004 | Rabinowitz et al. |
| 6,728,467 B2 | 4/2004 | Oshima |
| 6,744,789 B1 | 6/2004 | Michener |
| 6,772,434 B1 | 8/2004 | Godwin |
| 6,801,499 B1 | 10/2004 | Anandakumar et al. |
| 6,804,223 B2 | 10/2004 | Hoffmann et al. |
| 6,816,204 B2 | 11/2004 | Limberg |
| 6,861,964 B2 | 3/2005 | Breti et al. |
| 6,862,707 B2 | 3/2005 | Shin |
| 6,879,720 B2 | 4/2005 | Sarachik et al. |
| 6,930,983 B2 | 8/2005 | Perkins et al. |
| 6,996,133 B2 | 2/2006 | Bretl et al. |
| 7,110,048 B2 | 9/2006 | Weiss |
| 7,111,221 B2 | 9/2006 | Birru et al. |
| 7,197,685 B2 | 3/2007 | Limberg |
| 7,310,354 B2 | 12/2007 | Fimoff et al. |
| 7,324,545 B2 | 1/2008 | Chuah et al. |
| 7,336,646 B2 | 2/2008 | Muller |
| 7,349,675 B2 | 3/2008 | Karr et al. |
| 7,382,838 B2 | 6/2008 | Peting |
| 7,496,094 B2 | 2/2009 | Gopinath et al. |
| 7,532,677 B2 | 5/2009 | Simon |
| 7,532,857 B2 | 5/2009 | Simon |
| 7,539,247 B2 | 5/2009 | Choi et al. |
| 7,551,675 B2 | 6/2009 | Kroeger |
| 7,554,912 B2 | 6/2009 | Rodriguez-Sanchez et al. |
| 7,558,279 B2 | 7/2009 | Hwang et al. |
| 7,564,905 B2 | 7/2009 | Park et al. |
| 7,593,474 B2 | 9/2009 | Jeong et al. |
| 7,599,348 B2 | 10/2009 | Kang et al. |
| 7,602,749 B2 | 10/2009 | Proctor, Jr. |
| 7,667,780 B2 | 2/2010 | Weiss |
| 7,668,250 B2 | 2/2010 | Limberg |
| 7,672,399 B2 | 3/2010 | Simon |
| 7,702,337 B2 | 4/2010 | Vare et al. |
| 7,715,489 B2 | 5/2010 | Zeng |
| 7,715,491 B2 | 5/2010 | Yu et al. |
| 7,733,819 B2 | 6/2010 | Lee et al. |
| 7,738,582 B2 | 6/2010 | Simon |
| 7,773,684 B2 | 8/2010 | Jeong et al. |
| 7,779,327 B2 | 8/2010 | Lee et al. |
| 7,783,316 B1 | 8/2010 | Mitchell |
| 7,801,181 B2 | 9/2010 | Song et al. |
| 7,804,909 B2 | 9/2010 | Choi et al. |
| 7,822,134 B2 | 10/2010 | Kim et al. |
| 7,822,139 B2 | 10/2010 | Simon |
| 7,830,974 B2 | 11/2010 | Choi et al. |
| 7,852,961 B2 | 12/2010 | Chang et al. |
| 7,856,590 B2 | 12/2010 | Kim et al. |
| 7,890,047 B2 | 2/2011 | Kidd et al. |
| 7,933,351 B2 | 4/2011 | Kim et al. |
| 7,953,160 B2 | 5/2011 | Gordon et al. |
| 8,009,662 B2 | 8/2011 | Lee et al. |
| 2001/0017849 A1 | 8/2001 | Campanella et al. |
| 2002/0059482 A1 * | 5/2002 | Ashizaki et al. .................. 710/5 |
| 2002/0085548 A1 | 7/2002 | Ku et al. |
| 2002/0170060 A1 | 11/2002 | Lyman |
| 2003/0053493 A1 | 3/2003 | Mobley et al. |
| 2003/0099303 A1 | 5/2003 | Birru et al. |
| 2003/0100267 A1 | 5/2003 | Itoh et al. |
| 2003/0128826 A1 | 7/2003 | Benini et al. |
| 2003/0206596 A1 | 11/2003 | Carver et al. |
| 2005/0013249 A1 | 1/2005 | Kong et al. |
| 2005/0044475 A1 | 2/2005 | Yedidia et al. |
| 2005/0046600 A1 | 3/2005 | Bretl et al. |
| 2005/0084023 A1 | 4/2005 | Bott et al. |
| 2005/0147186 A1 | 7/2005 | Funamoto et al. |
| 2005/0207416 A1 | 9/2005 | Rajkotia |
| 2005/0238100 A1 | 10/2005 | Hsiao et al. |
| 2005/0249301 A1 | 11/2005 | Jeong et al. |
| 2006/0002464 A1 | 1/2006 | Choi et al. |
| 2006/0050770 A1 | 3/2006 | Wallace et al. |
| 2006/0067266 A1 | 3/2006 | Ehlers et al. |
| 2006/0093045 A1 | 5/2006 | Anderson et al. |
| 2006/0126556 A1 | 6/2006 | Jiang et al. |
| 2006/0211436 A1 | 9/2006 | Paila et al. |
| 2006/0245516 A1 | 11/2006 | Simon |
| 2007/0066272 A1 | 3/2007 | Vassiliou et al. |
| 2007/0074267 A1 | 3/2007 | Clerget et al. |
| 2007/0091857 A1 | 4/2007 | Elstermann |
| 2007/0143810 A1 | 6/2007 | Yousef |
| 2007/0174880 A1 | 7/2007 | Fite et al. |
| 2007/0230460 A1 | 10/2007 | Jeong et al. |
| 2008/0056219 A1 | 3/2008 | Venkatachalam |
| 2008/0175148 A1 | 7/2008 | Todd et al. |
| 2008/0181112 A1 | 7/2008 | Beck et al. |
| 2008/0205215 A1 | 8/2008 | Kikuchi et al. |
| 2008/0209464 A1 | 8/2008 | Wright-Riley |
| 2008/0211969 A1 | 9/2008 | Simon et al. |
| 2008/0247442 A1 | 10/2008 | Orlik et al. |
| 2008/0259835 A1 | 10/2008 | Venkatachalam |
| 2008/0273698 A1 | 11/2008 | Manders et al. |
| 2009/0003432 A1 | 1/2009 | Liu et al. |
| 2009/0013356 A1 | 1/2009 | Doerr et al. |
| 2009/0016435 A1 | 1/2009 | Brandsma et al. |
| 2009/0034442 A1 | 2/2009 | Song et al. |
| 2009/0040962 A1 | 2/2009 | Oger et al. |
| 2009/0100459 A1 | 4/2009 | Riedl et al. |
| 2009/0201997 A1 | 8/2009 | Kim et al. |
| 2009/0228764 A1 | 9/2009 | Lee et al. |
| 2009/0228765 A1 | 9/2009 | Lee et al. |
| 2009/0252266 A1 | 10/2009 | Heinemann et al. |
| 2009/0265751 A1 | 10/2009 | Limberg |
| 2009/0293086 A1 | 11/2009 | Lutterbach et al. |
| 2010/0023972 A1 | 1/2010 | Summers et al. |
| 2010/0142446 A1 | 6/2010 | Schlicht et al. |
| 2010/0142447 A1 | 6/2010 | Schlicht et al. |
| 2010/0150182 A1 | 6/2010 | Noronha, Jr. |
| 2010/0254449 A1 | 10/2010 | Rusch-Ihwe |
| 2011/0004912 A1 | 1/2011 | Teniou et al. |
| 2011/0170015 A1 | 7/2011 | Kim et al. |
| 2011/0230202 A1 | 9/2011 | Wood et al. |

FOREIGN PATENT DOCUMENTS

| | | |
|---|---|---|
| DE | 101 12 773 A1 | 9/2002 |
| DE | 10 2006 015 393 | 10/2007 |
| DE | 10 2007 012 465 | 5/2008 |
| EP | 0 837 609 | 4/1998 |
| EP | 0 926 894 | 6/1999 |
| EP | 1 079 631 A1 | 2/2001 |
| EP | 1 670 150 | 6/2006 |
| EP | 1 753 249 | 2/2007 |
| EP | 1 950 962 A1 | 7/2008 |
| EP | 1 965 386 A1 | 9/2008 |
| EP | 1 965 389 A2 | 9/2008 |
| GB | 2 399 719 | 9/2004 |
| WO | 2002/003728 | 1/2002 |
| WO | 2003/009590 | 1/2003 |
| WO | 2003/045064 | 5/2003 |
| WO | 2004/062183 A1 | 7/2004 |
| WO | 2004/062283 | 7/2004 |
| WO | 2006/046107 | 5/2006 |
| WO | 2006/066617 | 6/2006 |
| WO | 2006/084361 | 8/2006 |
| WO | 2007/046672 | 4/2007 |
| WO | 2007/114653 | 10/2007 |

(56) References Cited

FOREIGN PATENT DOCUMENTS

| WO | 2008/042694 | 4/2008 |
|---|---|---|
| WO | 2008/100000 A1 | 8/2008 |
| WO | 2008/117981 A1 | 10/2008 |
| WO | 2009/016175 | 2/2009 |
| WO | 2010/000407 | 1/2010 |

OTHER PUBLICATIONS

ATSC Digital Television Standard (A/53), "Annex D: RF/Transmission Systems Characteristics", Sep. 16, 1995, pp. 46-60.
ATSC Digital Television Standard (A/53) Revision E, Advanced Television Systems Committee, Dec. 27, 2005.
"ATSC-Mobile DTV Standard, Part 3-Service Multiplex and Transport Subsystem Characteristics", Advanced Television Systems Committee, Inc., Document A/153 Part 3:2009, Oct. 15, 2009, pp. 14-25.
ATSC Recommended Practice: Design of Synchronized Multiple Transmitter Networks (A/111), Advanced Television Systems Committee, Sep. 3, 2004.
ATSC Standard: Synchronization Standard for Distributed Transmission (A/110), Advanced Television Systems Committee, Jul. 14, 2004.
ATSC Standard: Synchronization Standard for Distributed Transmission, Revision A (A/110A), Advanced Television Systems Committee, Jul. 19, 2005.
ATSC Standard: Synchronization Standard for Distributed Transmission, Revision B (A/110B), Advanced Television Systems Committee (Dec. 24, 2007).
ATSC Technology Group Report: DTV Signal Reception and Processing Considerations, Doc. T3-600r4, Advanced Television Systems Committee, Sep. 18, 2003.
Battisa, "Spectrally Efficient High Data Rate Waveforms for the UFO SATCOM Channel", Military Communications Conference, MILCOM 98, Proceedings, Oct. 18-21, 1998, pp. 134-139, IEEE vol. 1.
Citta, R., et al., "ATSC Transmission System: VSB Tutorial", Zenith Electronics Corporation, Symposium Handout, Montreuz Symposium, Jun. 12, 1997.
"Digital Video Broadcasting (DVB); DVB Mega-Frame for Single Frequency Network (SFN) Synchronization", European Broadcasting Union; eTSI TS 101 191 v1.4.1, Jun. 2004.
"European Broadcasting Union Union Europeenne de Radio-Television Digital Video Broadcasting (DVB); Specification for Service Information (SI) in DVB systems; ETS 300 468", ETSI Standards, Lis, Sophia Antipolis Cedex, France, vol. BC, Second Edition, Jan. 1, 1997, pp. 1-72.
Lecture 4: Digital Television the DVB transport stream, obtained from http://www.abo.fi/~jbjorkqv/digitv/lect4.pdf (last visited May 4, 2006).
Lee, Y., et al., "ATSC Terrestrial Digital Television Broadcasting Using Single Frequency Networks", ETRI Journal, Apr. 2004, pp. 92-100, vol. 26, No. 2.
Owen, H., "Proposed Modifications to ATSC Digital Television Standard to Improve Performance in the Face of Dynamic Multipath for Both Fixed and Mobile Operation", Sarnoff Corporation, Apr. 2, 2001.
Patel, C. B., et al., "Proposal to ATSC Subcommittee T3/S9 to Provide 8-VSB With a Repetitive-PN1023 Signal for Rapidly and Reliably Initializing Tracking in an Adaptive Equalizer Despite Adverse Multipath Conditions", Apr. 12, 2001.
Proposal for Enhancement of ATSC RF Transmission System (Revision to A/53), submitted by Samsung, Draft ver. 1.0, Sep. 16, 2004.
Raghunandan, K., "Satellite Digital Audio Radio Service (SDARS) System Architecture and Receiver Review", IEEE, Oct. 27, 2005.
Vogel, W. J., et al., "Propagation Effects and Satellite Radio Design", Paper No. 1445, Maastricht Exhibition and Congress Centre (MECC), Aug. 17-24, 2002.
Wang, "A New Implementation of Single Frequency Network Based on DMB-T", 2004 International Conference on Communications, Circuits and Systems (2004 ICCCAS), Jun. 27-29, 2004, pp. 246-249, vol. 1.
Wang, X., et al., "Transmitter Identification in Distributed Transmission Network and its Applications in Position Location and a New Data Transmission Scheme", NAB Broadcast Engineering Conference, Apr. 16-21, 2005, pp. 511-520.
Whitaker, J. C., "Standard Handbook of Video and Television Engineering", Chapter 17.2 "ATSC DTV Received Systems", 2000, pp. 17-63 to 17-99.
International Preliminary Report on Patentability, PCT/US2006/007265, Oct. 4, 2007.
International Preliminary Report on Patentability, PCT/US2006/020599, Nov. 30, 2007.
International Preliminary Report on Patentability, PCT/US2006/022300, Dec. 27, 2007.
International Preliminary Report on Patentability, PCT/EP2008/000837, Aug. 6, 2009.
International Preliminary Report on Patentability, PCT/EP2009/004590, Nov.19, 2010.
International Search Report and Written Opinion of the International Searching Authority, PCT/EP2008/000837, Aug. 12, 2008.
International Search Report and Written Opinion of the International Searching Authority, PCT/EP2009/004590, Jun. 16, 2010.
International Search Report and Written Opinion of the International Searching Authority, PCT/US2006/007251, May 20, 2008.
International Search Report and Written Opinion of the International Searching Authority, PCT/US2006/007265, Sep. 4, 2007.
International Search Report and Written Opinion of the International Searching Authority, PCT/US2006/015317, May 14, 2008.
International Search Report and Written Opinion of the International Searching Authority, PCT/US2006/020599, Aug. 31, 2007.
International Search Report and Written Opinion of the International Searching Authority, PCT/US2006/022300, Mar. 29, 2007.
"ATSC Digital Television Standard (A/53) Revision E with Amendment No. 1", Advanced Television Systems Committee, Apr. 18, 2006, pp. 45-91.
Yucek, T., et al., "A Survey of Spectrum Sensing Algorithms for Cognitive Radio Applications," IEEE Communications Surveys & Tutorials, Mar. 4, 2009, pp. 116-130, vol. 11, No. 1.
Peha, J. M., "Sharing Spectrum Through Spectrum Policy Reform and Cognitive Radio," Proceedings of the IEEE, Apr. 2009, pp. 708-719, vol. 97, No. 4.
Zhao, Y., et al., "Experimental Study of Utility Function Selection for Video Over IEEE 802.22 Wireless Regional Area Networks," 5th International Conference on Testbeds and Research Infrastructures for the Development of Networks & Communities and Workshops, 2009, Dates of Conference: Apr. 6-8, 2009, pp. 1-10.
Lee, J. M., et al., "Adaptive Hybrid Transmission Mechanism for On-Demand Mobile IPTV Over WiMax," IEEE Transactions on Broadcasting, Jun. 2009, pp. 468-477, vol. 55, No. 2.
Wen C. C., et al., "Hybrid Tree Based Explicit Routed Multicast for QoS Supported IPTV Service," Proceedings of the IEEE Global Telecommunications Conference, 2009, Dates of Conference: Nov. 30, 2009-Dec. 4, 2009, pp. 1-6.
Ding, J. W., et al., "Quality-Aware Bandwidth Allocation for Scalable On-Demand Streaming in Wireless Networks," IEEE Journal on Selected Areas in Communications, Apr. 2010, pp. 366-376, vol. 28, No. 3.
Sachs, J., et al., "Cognitive Cellular Systems Within the TV Spectrum," IEEE Symposium on New Frontiers in Dynamic Spectrum, 2010, Dates of Conference: Apr. 6-9, 2010, pp. 1-12.
Karimi, H. R., et al., "European Harmonized Technical Conditions and Band Plans for Broadband Wireless Access in the 790-862 MHz Digital Dividend Spectrum," IEEE Symposium on New Frontiers in Dynamic Spectrum, 2010, Dates of Conference: Apr. 6-9, 2010, pp. 1-9.

* cited by examiner

Dummy Byte Signaling Syntax

| Packet # | Byte # | | | |
|---|---|---|---|---|
| 1 | 21 | Mode (1bit) | Subframe_num (3 bits) | Slot_num (4 bits) |
| 1 | 22 | Sync_time_stamp (24 bits) | | |
| 1 | 73 | | | |
| 1 | 74 | Maximum_delay (24 bits) | | |
| 1 | 125 | | | |
| 1 | 126 | | | |
| 1 | 177 | System_time (2 bits) | MTxID (1 bit) | MTxID_align (2 bits) | Reserved (3 bits) |
| 1 | 192 | Adjusted_gps_seconds_count (32 bits) | | |
| 2 | 22 | | | |
| 2 | 74 | | | |
| 2 | 126 | | | |
| 2 | 178 | CRC-8 (8 bits) | | |
| 2 | 192 | | | |

FIG. 9

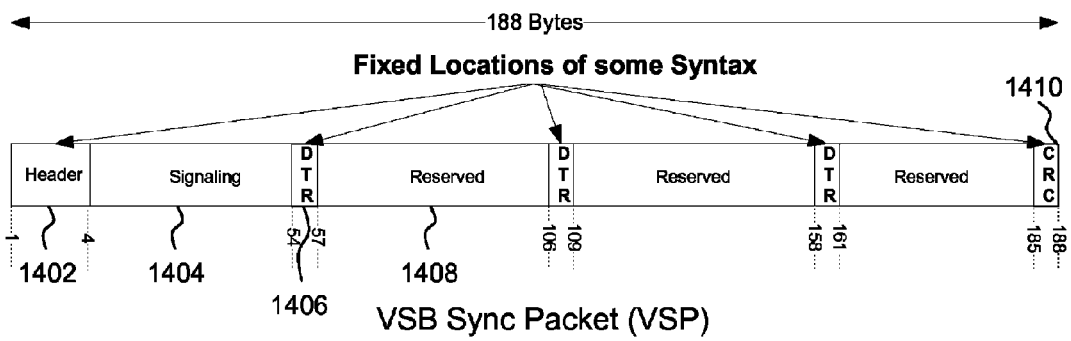
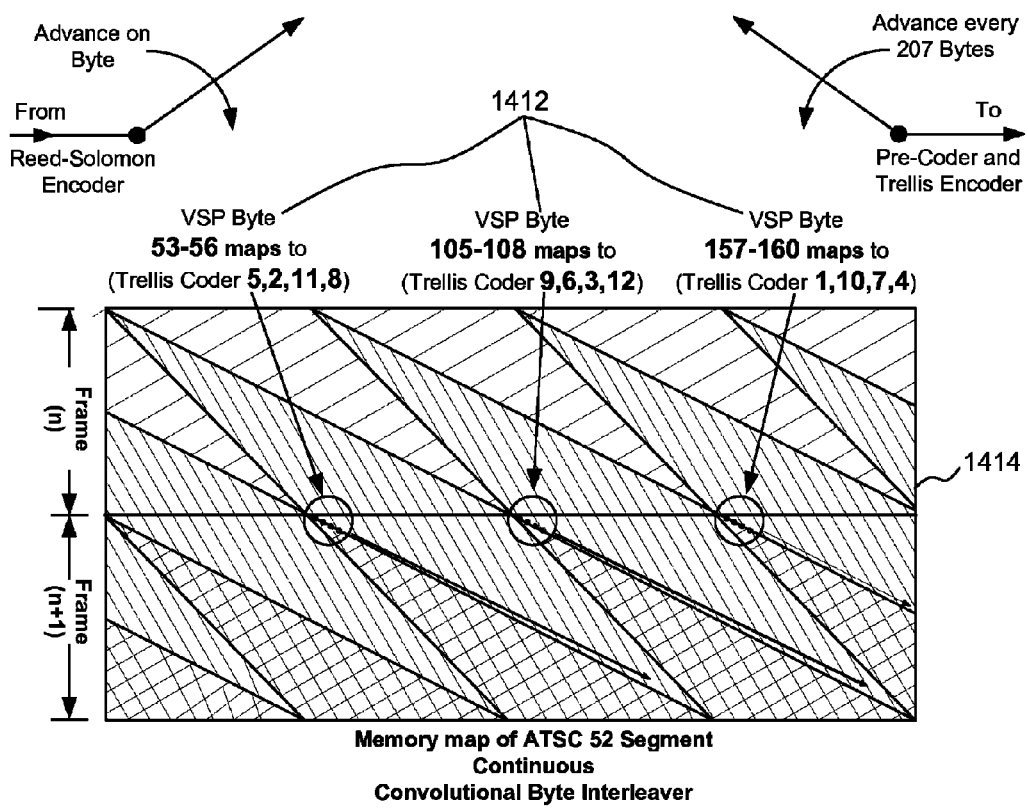
FIG. 14

VSB Sync Packet (VSP)

| VSP Byte | Syntax |
|---|---|
| 1, 2, 3, 4 | Normal ATSC Header (32 bits)<br>PID can be a reserved value or freely assigned by Mux and discovered by exciter |
| 5 | Mode (1 bit), System Time (2 bits), Reserved (5 bits) |
| 6, 7, 8 | Sync_time_stamp (24 bits) |
| 9, 10, 11 | Max_Delay (24 bits) |
| 12, 13, 14, 15 | Adjusted_gps_seconds_count (24 bits) |
| 54, 55, 56, 57 | DTR (32 bits all set '1') |
| 106, 107, 108, 109 | DTR (32 bits all set '1') |
| 158, 159, 160, 161 | DTR (32 bits all set '1') |
| 185, 186, 187, 188 | CRC-32 (32 bits) |
| xxx | All remaining unused Bytes/ bits are Reserved and set to '1' |

FIG. 15

APPARATUS, SYSTEMS, METHODS AND COMPUTER PROGRAM PRODUCTS FOR PRODUCING A SINGLE FREQUENCY NETWORK FOR ATSC MOBILE / HANDHELD SERVICES

CROSS REFERENCE TO RELATED APPLICATIONS

This application is a division of U.S. application Ser. No. 12/491,305, filed on Jun. 25, 2009, which claims priority to, and benefit of, U.S. Provisional Application No. 61/075,523, filed Jun. 25, 2008, and U.S. Provisional Application No. 61/111,761, filed Nov. 6, 2008, the disclosures of which are hereby incorporated by reference herein.

BACKGROUND

1. Field

The present invention generally relates to ATSC digital television ("DTV") and mobile/handheld ("M/H") broadcast systems, and more particularly to data frame and trellis encoder synchronization.

2. Related Art

A single-frequency network ("SFN") is a collection of transmitters operating on the same frequency for carrying the same information to receivers in a given area. The transmitters emit identical signals, several of which may be received more or less simultaneously by individual receivers. One application of SFNs is for transmission of digitally encoded data for digital television ("DTV"), the system and related standards for which have been established by the Advanced Television Systems Committee ("ATSC"). Under the ATSC's DTV standard (or A/53 standard), it is possible to transmit large amounts of data including high definition pictures, high quality sound, multiple standard definition pictures, and other ancillary related or unrelated communications, which may be accessible by using, for example, a stationary receiver such as a computer or television set. Such stationary receivers are also interchangeably referred to as "fixed" receivers. The data broadcasted to stationary receivers are interchangeably referred to as "normal data," "main service data" and "main stream data."

Another application of SFNs is for transmission of digitally encoded data for mobile/handheld ("M/H") devices, the system and related standards for which are currently being established as a candidate standard, the document for which is designated the ATSC A/153 candidate standard (also referred to as the "M/H DTV candidate standard"). Under the A/153 candidate standard, M/H broadcasting services share the same RF channel as the ATSC A/53 broadcast service and are provided using a portion of the ~19.39 Mbps of the ATSC 8-level vestigial sideband ("8-VSB") signal bandwidth.

FIG. 1 depicts the system core functions and enhancement tools that have been added to the A/53 standard 102 to form the A/153 candidate standard 112. Generally, the A/53 candidate standard is based on the VSB modulation as is the standard ATSC A/53 broadcast service, coupled with additional forward error correction mechanisms and known training sequences to aid mobile receivers. As shown in FIG. 1, the A/153 candidate standard requires, among other things, known data frame offsets 104 to map data packets with the A/153 standard's frame structure, and pre-coder and trellis encoder initialization 106 (pre-coder and trellis encoder are collectively referred to herein as a "trellis coder"), which provides in part the mechanism for creating known training sequences. Techniques for providing VSB data frame and trellis coder synchronization are described in U.S. Pat. No. 7,532,677 (the '677 patent), which is hereby incorporated herein by reference in its entirety.

The system achieves the robustness needed for mobile reception by adding extra training sequences 108 and several levels of forward error correction ("FEC"), one at the packet layer by a 2D Reed Solomon/CRC code, and another at the physical layer by a serial concatenated convolution code ("SCCC") 110, which is formed together with the trellis coding of the 8-VSB exciter. A parallel concatenated code ("PCCC") is also used for robust signalling to the mobile receiver.

FIG. 2 depicts a block diagram of an ATSC M/H transmission system including a pre-processor 204 (also referred to as an "M/H multiplexer") and a post-processor $222_1, 222_2, \ldots, 222_i, \ldots, 222_n$. Generally, the M/H system is a dual-stream system including an ATSC service multiplexer for existing digital television services or "main service" data and an M/H service multiplexer for one or more mobile and handheld services or "M/H service" data. An example of such a transmission system is described in U.S. Pat. No. 7,532,857, which is hereby incorporated herein by reference in its entirety.

As shown in FIG. 2, the main service and M/H service multiplexers feed into a head-end 202 (e.g., in a studio) where signal processing of main and M/H service data is performed. The processed data is then communicated over a studio-transmitter link ("STL") $206_1, 206_2, \ldots, 206_i, \ldots, 206_n$ to a post-processor $222_1, 222_2, \ldots, 222_i, \ldots, 222_n$ at a remotely positioned transmitter $224_1, 224_2, \ldots, 224_i, \ldots, 224_n$. As described in the A/153 candidate standard, in pre-processor 204, M/H service data are encoded with a Reed-Solomon/CRC ("RS/CRC") coding in the M/H Frame encoder 210, a serial concatenated convolutional encoder in the block processor 212. Pre-processor 204 also generates signalling information such as status data such as the length, the periodicity and the sequence number of data units for each service, the time marker for transmission time of each data unit, and so on which are PCCC (Parallel concentrated code) encoded by a signalling encoder 213 and combined with MH encoded data in the group formatter 214. The encoded M/H payload data containing M/H training signals, additional control and status data are formatted into a MH Group by the group formatter 214 and formed into Mobile Handheld Encapsulated (MHE) transport stream (TS) data packets with a packet identifier ("PID") (in a normal ATSC TS header) by the packet formatter 216 at the end of pre-processing.

Markers in TS data packets with main service data are modified by a packet timing and program clock reference (PCR) adjustment unit 220 which performs packet timing and PCR adjustment. A consecutively positioned packet multiplexer 218 multiplexes the normal TS data packets with MHE TS data packets to form the nominal 19,392658 bit/s data rate specified in the A/53 standard.

At each remote positioned transmitter $224_1, 224_2, \ldots, 224_i, \ldots, 224_n$, in the post-processor $222_1, 222_2, \ldots, 222_i, \ldots, 222_n$, the normal data packets are channel coded as specified in A/53 to maintain compatibility with normal ATSC receivers. This includes stages which provide data randomization by a data randomizer $226_1, 226_2, \ldots, 226_i, 226_n$, systematic/non-systematic RS encoding by encoder $228_1$, data interleaving by interleaver $230_1, 230_2, \ldots, 230_i, 230_n$, and trellis encoding by trellis encoder $234_1, 234_2, \ldots, 234_i, 234_n$. All stages in the post processor $222_1, 222_2, \ldots, 222_i, \ldots, 222_n$ other than data interleaver $230_i$ have a dual mode (i.e. normal/MHE) capability which is selected per the type of packet (normal/MHE) being processed. Each post-processor $222_1, 222_2, \ldots, 222_i, \ldots, 222_n$ is followed by a synchronization multiplexer $240_1, 240_2, \ldots, 240_i, \ldots, 240_n$ for inserting synchronizing data (e.g., data field segments and data segment sync). Signalling is inserted in the data field sync to signal to receivers when MH mode is active or not, a pilot inserter $242_1, 242_2, \ldots, 242_i, \ldots, 242_n$ for inserting pilot symbols in the transport data stream, an optional pre-equalizer $244_1, 244_2, \ldots, 244_i, \ldots, 244_n$, an 8-VSB modulator $246_1, 246_2, \ldots, 246_i, \ldots, 246_n$, an RF-up-converter $248_1, 248_2, \ldots, 248_i, \ldots, 248_n$ for RF signal processing and a transmitter antenna $250_1, 250_2, \ldots, 250_i, \ldots, 250_n$.

Non-Systematic RS parity bytes are calculated and placed in known positions within each MH Group by Non-Systematic RS encoding in encoder $228_1, 228_2, \ldots, 228_i, 228_n$, these positions enable, in part, the generation of six long MH training signals in each MH Group. Each of the six training sequences begins with 12 initialization bytes (one for each 1 of 12 trellis encoders) and is used by modified trellis encoder $234i, 234_2, \ldots, 234_i, 234_n$ to initialize all trellis states to a known zero value before the following known training data begins to enter the trellis encoder. This action will create known repeatable training symbols for MH receivers. The encoder $228_1, 228_2, \ldots, 228_i, 228_n$ inserts the non-systematic parity bytes prior to trellis initialization in modified trellis encoder $234_1, 234_2, \ldots, 234_i, 234_n$. Some parity will become erroneous after the training initialization bytes are processed (i.e., values are changed) in modified trellis encoder according to the A/153 candidate standard. Accordingly, modified trellis encoder $234_1, 234_2, \ldots, 234_i, 234_n$ supplies these changed initialization bytes to a non-systematic RS encoder $236_1, 236_2, \ldots, 236_i, 236_n$, which (non-systematically) re-calculates the RS parity of corresponding M/H packets using the changed data and original packet data from data interleaver $230_1, 230_2, \ldots, 230_i, 230_n$. The new RS parity bytes obtained by performing the non-systematic RS re-encoding process are supplied to RS parity replacer $238_1, 238_2, \ldots, 238_i, 238_n$, which selects the output of the data interleaver $230_1, 230_2, \ldots, 230_i, 230_n$ or the output of non-systematic RS encoder $236_1, 236_2, \ldots, 236_i, 236_n$ with the re-calculated RS parity.

FIG. 3 depicts the structure of an M/H Frame according to the A/153 candidate standard. As shown in FIG. 3, a data stream of consecutively transmitted M/H data frames includes 5 M/H Sub-Frames. Each sub-frame contains 156 TS data packets and each TS data packet is 188 bytes. Each set of 156 TS data packets is referred to as an M/H Slot which can contain a combination of M/H data packets and normal data packets, or only normal data packets. In normal data packets, only digital data for stationary (or fixed) receivers are transferred, whereas M/H data packets contain only data for M/H receivers.

More specifically, an M/H Slot may contain 118 data packets with data for M/H receivers (i.e., "M/H Group") and 38 data packets of normal data for stationary receivers, i.e., "normal 38 packets". Alternatively, an M/H Slot may contain 156 data packets of normal data only (i.e., "normal 156 packets" with data for stationary or "main stream" receivers). The mapping of the received ATSC M/H packets to positions in an 8-level vestigial sideband ("8-VSB") data field is shown in FIG. 4. One purpose for this data mapping is to ensure MHE TS packets sent from pre-processor 204 are synchronized in and with post-processor $222_1, 222_2, \ldots, 222_i, 222_n$ in the MH exciter. This mapping also enables MH receivers to tune and select the MH data wanted during reception by ensuring the MH data will be at known symbol positions in the physical layer VSB Frame. As shown in FIG. 4, the 38th data packet (#37) in an ATSC M/H Group received in the first data slot #0 of a first sub-frame #0 in the received ATSC M/H data frame is mapped to the first position for a data packet in an odd VSB data field.

The 38th data packet in the ATSC M/H Group received in Slot #2 is mapped to the first position for a data packet in an even VSB data field. The 38th data packet in the ATSC M/H Group received in Slot #1 is mapped to the 157th position for a data packet in an odd VSB data field. And, the 38th data packet in the ATSC M/H Group received in Slot #3 is mapped to the 157th position for a data packet in an even VSB data field.

According to the A/153 candidate standard, an ATSC M/H Group with a data structure corresponding to FIG. 4 is created in the pre-processor 204 (FIG. 2) in the ATSC M/H channel of the head-end 202 (FIG. 2). In total, 45 dummy bytes are placed in the 118 MHE packets of an ATSC M/H Group. These A/153 dummy bytes are used as padding bytes and serve no other useful purpose. Some of these dummy bytes will be used in the present invention to create a point to point signalling channel between pre-processor and post-processor. There are 13 dummy bytes in the first two (2) MHE packets including eight (8) dummy bytes in the $1^{st}$ MHE packet and five (5) dummy bytes in the $2^{nd}$ MHE packet. When transmitted between transmitters and receivers, all these dummy bytes typically have a fixed pre-selected value, e.g. 0xAF.

Since the pre-processor 204 and post-processor(s) $222_1, 222_2, \ldots, 222_i, 222_n$ (FIG. 2) are remote from each other, they need to be synchronized to one another (i.e., a deterministic mapping with a known packet offset between the start of a VSB field and the MHE packets carrying enhanced data must be set). There also needs to be a way for the post processor $222i$ to distinguish MHE packets and normal data packets when the packets are received at the exciter. Currently, neither the A/53 nor A/153-candidate standards provide mechanisms for signalling a mode or for synchronization between the pre- and post processors, or for identifying the MHE packets in the exciter. In addition, there is a need to provide a mechanism to switch between modes in ATSC SFN, particularly ATSC SFN with M/H services and ATSC SFN without M/H services, and vice versa. U.S. patent application Ser. No. 12/468,938 (the "'938 application"), filed on May 20, 2009, and hereby incorporated herein by reference in its entirety, describes example mechanisms for performing such synchronization and identification for a single transmitter.

As described in the '938 application, to synchronize the pre-processor with the post-processor, each exciter uses signalling information determined in the pre-processing stage at the head-end. This signalling information is inserted by the packet multiplexer (FIG. 2, 218) in particular byte positions in the MH Group that are set aside for dummy bytes specified in the A/153 candidate standard.

BRIEF DESCRIPTION

The example embodiments described herein meet the above-identified needs by providing apparatus, systems, methods and computer program products for producing a single frequency network for ATSC mobile/handheld services.

In one aspect of the present invention, a method for producing coherent symbols from digital RF transmitters is provided. The method includes selecting, by a processor, data bytes corresponding to mobile-handheld (MH) encapsulation (MHE) packets and setting each one of the trellis coders to a predetermined state when a predetermined number of bits of the data bytes enter a corresponding trellis coder. This causes the digital RF transmitters to transmit symbols coherently.

In another example aspect of the present invention, an apparatus for producing coherent symbols is provided. The apparatus includes a processor and trellis coders. The processor selects data bytes corresponding to mobile-handheld (MH) Encapsulation (MHE) packets and the trellis coders are capable of being set to a predetermined state based on a predetermined number of bits of the data bytes, correspondingly. This causes the digital RF transmitters to transmit symbols coherently.

In yet another example aspect of the present invention, a method for performing data frame synchronization is provided, including replacing a predetermined number of bytes to be transmitted onto a studio-transmitter link with bytes containing signalling information and transmitting the predetermined number of bytes in a transport stream over the studio-to transmitter link.

The method may further include assigning a packet identifier to a predetermined number of transport stream packets, where the packet identifier is unknown or known (i.e., prestored) to a post processor on the studio-transmitter link. The method includes calculating a first checksum on the bytes containing the signalling information, and transmitting the first checksum onto the studio-transmitter link to the post-processor. If the packet identifier is unknown, upon receiving the transport stream from the studio-transmitter link, parsing is performed on the transport stream to obtain the packet identifier of each transport stream packet. In addition, searching for a predetermined number of consecutive transport stream packets having the same packet identifier, calculating a second checksum of a portion of the predetermined number of transport stream packets, comparing the first checksum and the second checksum, and extracting the signalling information if the first checksum and the second checksum are the same are performed. The signalling information obtained from the extracting is used to perform frame synchronization.

If the packet identifier has been prestored, searching for the predetermined number of transport stream packets having the packet identifier prestored in the memory is performed. In turn, calculating a second checksum of a portion of the predetermined number of transport stream packets, comparing the first checksum and the second checksum, and extracting the signalling information if the first checksum and the second checksum are the same are performed. The signalling information obtained from the extracting is then used to perform frame synchronization.

In yet another aspect of the present invention, a system for performing data frame synchronization is provides including a group formatter and a packet transmitter. The group formatter replaces bytes to be transmitted onto a studio-transmitter link with bytes containing signalling information and the packet transmitter transmits the bytes in a transport stream over the studio-transmitter link.

A multiplexer and processor may also be provided to the system. The multiplexer assigns a packet identifier to a predetermined number of transport stream packets, the packet identifier being unknown or known (i.e., prestored) to a post processor on the studio-transmitter link. A checksum calculator calculates a first checksum on the bytes containing the signalling information and the packet transmitter further transmits the first checksum onto the studio-transmitter link to the post-processor. A packet receiver receives the transport stream from the studio-transmitter link and a processor parse the transport stream to obtain the packet identifier of each transport stream packet. In the case where the packet identifier is unknown, the processor searches for a predetermined number of consecutive transport stream packets having the same packet identifier, calculates a second checksum of a portion of the predetermined number of transport stream packets, and compares the first checksum and the second checksum. The processor then extracts the signalling information if the first checksum and the second checksum are the same, and uses the signalling information obtained from said extracting to perform frame synchronization.

In the case where the packet identifier is known the processor searches for the predetermined number of transport stream packets having the packet identifier prestored in the memory, calculates a second checksum of a portion of the predetermined number of transport stream packets, compares the first checksum and the second checksum, and extracts the signalling information if the first checksum and the second checksum are the same. The processor then uses the signalling information to perform frame synchronization.

In yet another aspect of the present invention, a method is provided for signalling a change in single frequency network (SFN) modes including a SFN with mobile-handheld (MH) data services mode and an SFN without MH data services mode. The method includes receiving a signalling packet containing a mode element for switching each RF transmitter between the SFN with MH data services mode and the SFN without MH data services mode and signalling to an exciter, based on the value of the mode element, that a predetermined number of data frames following the signalling packet will correspond to at least one of (1) the SFN mode with MH data services, and (2) the SFN mode without MH data services.

Another aspect of the invention provides an apparatus for signalling a change in single frequency network (SFN) modes including a SFN with mobile-handheld (MH) data services mode and an SFN without MH data services mode including a packet receiver and a processor. The packet receiver receives a signalling packet containing a mode element for switching each RF transmitter between the SFN with MH data services mode and the SFN without MH data services mode. The processor generates a signal to an exciter, based on the value of the mode element, that a predetermined number of data frames following the signalling packet will correspond to at least one of (1) the SFN mode with MH data services, and (2) the SFN mode without MH data services.

Further features and advantages, as well as the structure and operation, of various example embodiments of the present invention are described in detail below with reference to the accompanying drawings.

BRIEF DESCRIPTION OF THE DRAWINGS

The features and advantages of the example embodiments of the invention presented herein will become more apparent from the detailed description set forth below when taken in conjunction with the drawings in which like reference numbers indicate identical or functionally similar elements.

FIG. 9 illustrates a signalling syntax used in place of 13 dummy bytes in an M/H Group in accordance with an embodiment of the present invention;

FIG. 14 depicts a memory map of an ATSC 52-segment continuous convolutional byte interleaver showing time dispersion of inserted VSB synchronization packet ("VSP") which has some fixed byte syntax locations in ATSC SFN (i.e., without mobile data) in accordance with an embodiment of the present invention;

FIG. 15 depicts a syntax for a VSB synchronization packet ("VSP") in ATSC SFN (i.e., without mobile data) in accordance with an embodiment of the present invention;

DETAILED DESCRIPTION

The example embodiments of the invention presented herein are directed to apparatus, systems, methods and computer program products for producing a single frequency network for ATSC mobile/handheld services. This is for convenience only and is not intended to limit the application of the present invention. In fact, after reading the following description, it will be apparent to one skilled in the relevant art(s) how to implement the following invention in alternative embodiments (e.g., single transmitter or multi-frequency networks).

I. General Overview

Figure 5:
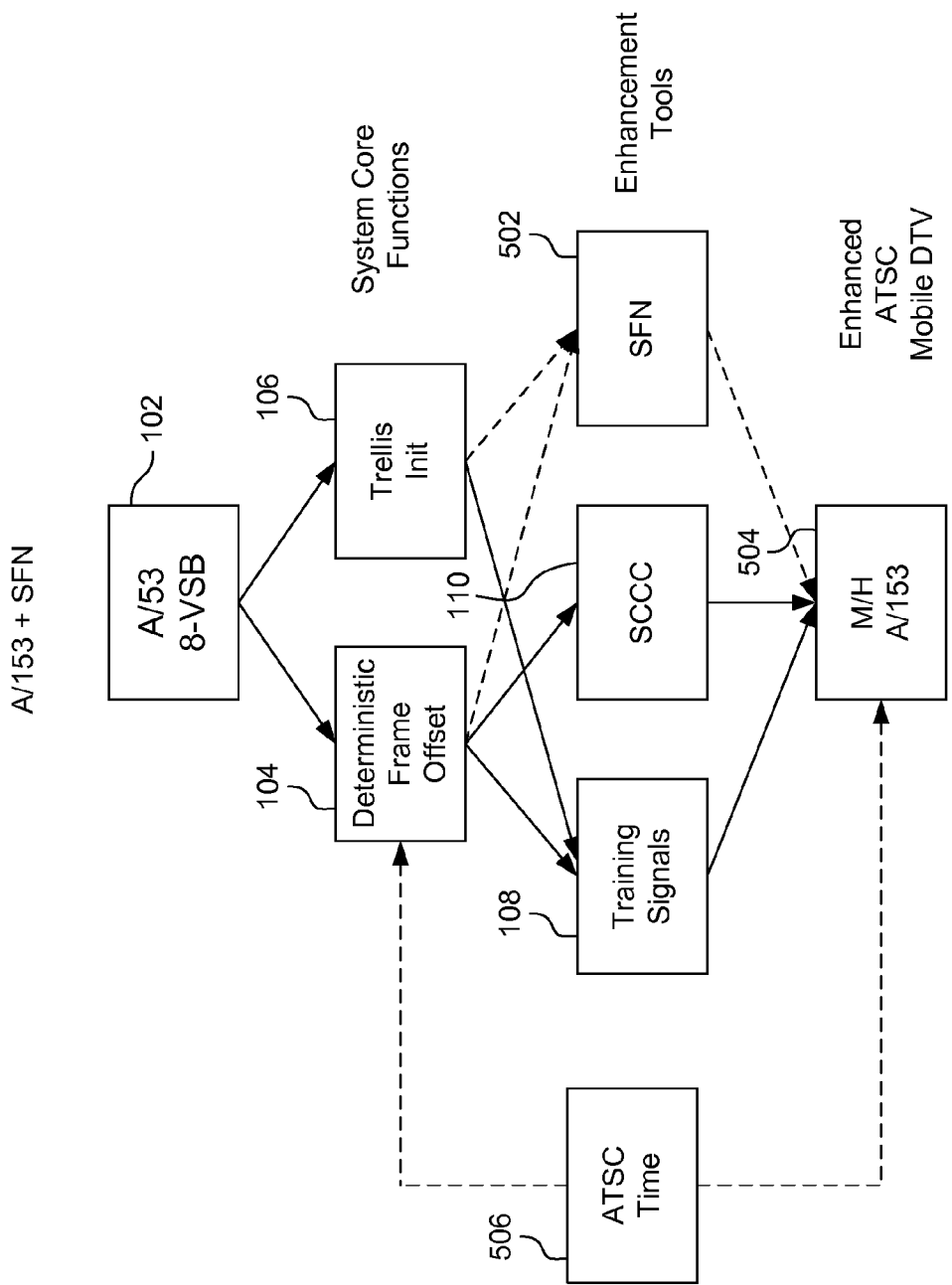
FIG. 5 depicts the system core functions and enhancement tools that have been added to the A/53 standard which results in enhanced ATSC mobile DTV, in accordance with an embodiment of the presentation invention.

FIG. 5 depicts the system core functions and enhancement tools that have been added to the A/53 standard which results in an enhanced ATSC mobile DTV standard 504. As shown in FIG. 5, the core functions of deterministic frame offset and trellis initialization have been leverage for the mechanisms for providing SFN 502. Some new ATSC Time 506 enhancement tools are shown coupled with the existing ATSC A/153 candidate standard. Generally, example aspects of the present invention describe mechanisms for synchronizing MHE packets with VSB data frames and the synchronizing of trellis coders in an ATSC M/H DTV system in either an SFN or non-SFN environment. ATSC Time 506, which is applicable for data frame alignment, is described in U.S. patent application Ser. No. 12/024,238, which is hereby incorporated herein by reference in its entirety.

II. ATSC M/H Transmission System

Figure 6:
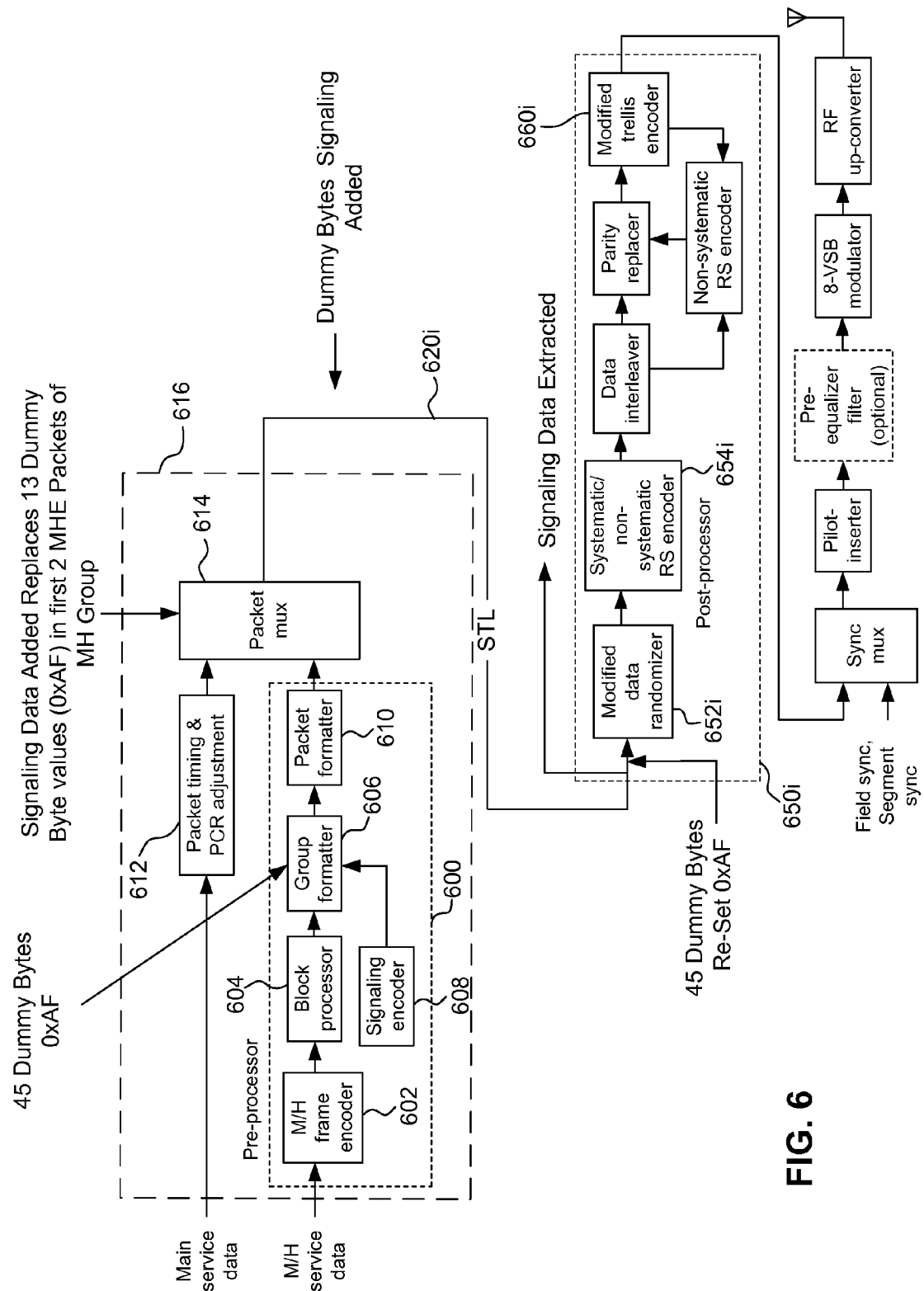
FIG. 6 is a block diagram of a pre-processor and a post processor with a mechanism for inserting signalling into the TS stream over the STL in accordance with an embodiment of the present invention.

FIG. 6 is a block diagram of an ATSC M/H transmission system including a pre-processor 600 (also referred to interchangeably as an "M/H multiplexer") and a post processor $650_1, 650_2, \ldots, 650_i, 650_n$. In the head-end 616, pre-processor 600 includes an M/H Frame encoder 602, a block processor 604, a group formatter 606, a signalling encoder 608, and a packet formatter 610. M/H Frame encoder 602 receives M/H service data and constructs RS/CRC Frames from the M/H service data. Block processor 604, in turn, performs an outer Serial Concatenated Convolution Code (SCCC) of the coded data received from the M/H Frame encoder 602. Group formatter 606 maps the FEC coded M/H service data received from block processor 604 into corresponding M/H blocks of an M/H Group, along with pre-determined training data bytes, PCCC-encoded signalling data, and data bytes to be used for initializing the trellis encoder memories. Group formatter 606 also inserts placeholder bytes for main service data, MPEG-2 headers, non-systematic RS parity, and dummy data bytes to complete construction of the intended group format. A packet formatter 610 then processes and formats the bytes of data output by group formatter 606 and completes creation of the MHE packets. PCR adjustment unit 612 performs packet timing and PCR adjustment. A consecutively positioned packet multiplexer 614, in turn, multiplexes the normal TS data fed by packet timing and PCR adjustment unit 612 with MHE TS data packets fed by packet formatter 610.

III. M/H Data Frame Synchronization Using Dummy Bytes

Figure 7:
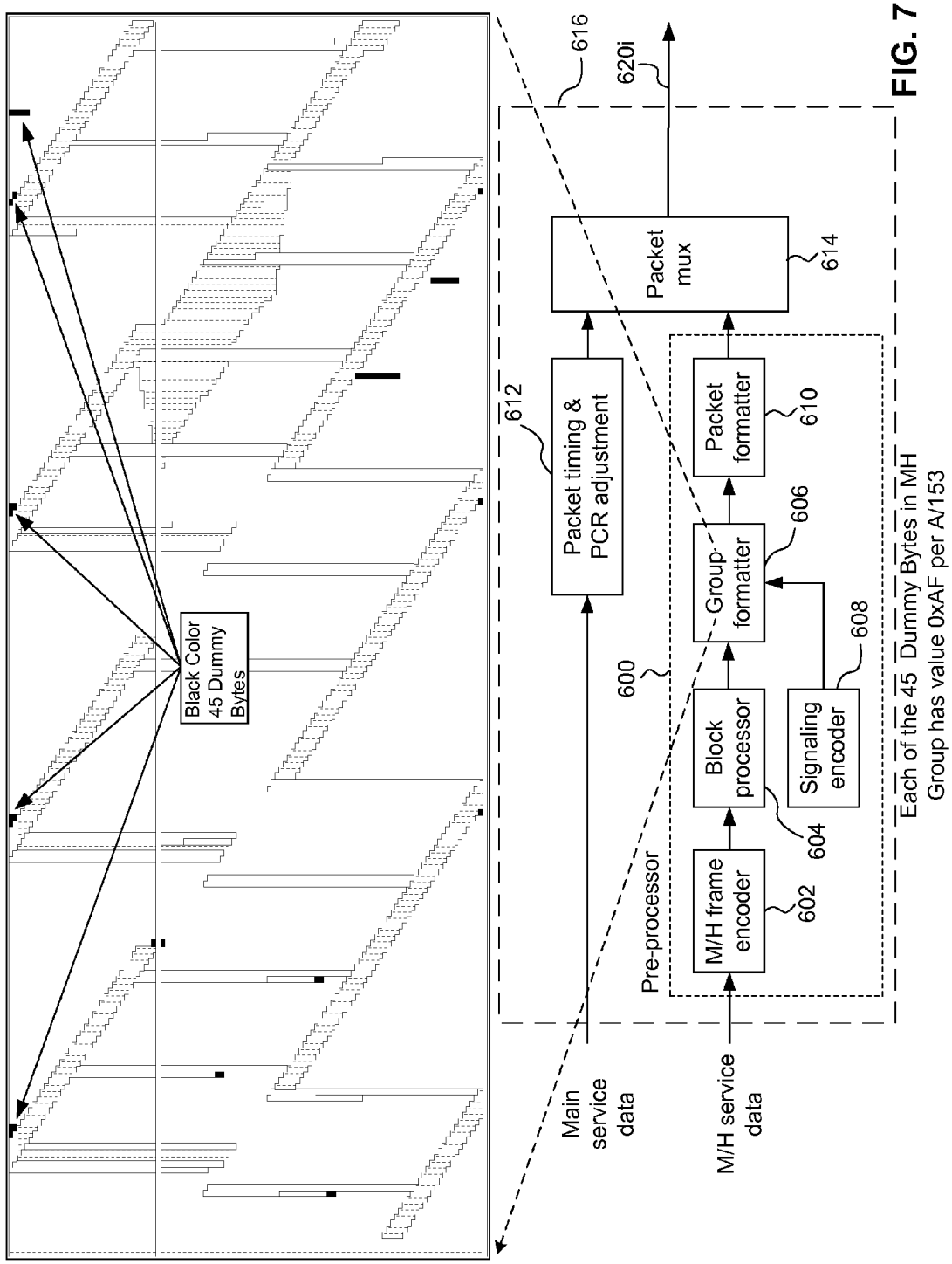
FIG. 7 depicts A/153 pre-processor architecture and where the group formatter inserts 45 dummy bytes into an MH Group.

FIG. 7 depicts the architecture of a pre-processor 600 described above with respect to FIG. 6 as well as a mapping showing locations populated by dummy bytes. Group formatter 606, normally fills the M/H Frame with 45 dummy data bytes each in a known location and having a value of 0xAF per the A/153 candidate standard to complete the M/H Group structure. Thirteen (13) of these dummy bytes from the first two (2) MHE packets of a MH Group will be replaced with a new signalling syntax in the packet multiplexer 614. Referring to both FIGS. 6 and 7, the new dummy byte syntax is transmitted from packet multiplexer 614 over the STL $620_1, 620_2, \ldots, 620_i, 620_n$ to the post-processor $650_i$ in part to signal MH framing in the post-processor $650_1, 650_2, \ldots, 650_i, 650_n$ (e.g., exciter). Post-processor $650_1, 650_2, \ldots, 650_i, 650_n$ extracts the signalling data and replaces the fields holding this data with dummy bytes with the normal value 0xAF per the A/153 candidate standard. Hence, a point to point signalling channel between the pre-processor 600 and post-processor $650_1, 650_2, \ldots, 650_i, 650_n$ over the STL $620_1, 620_2, \ldots, 620_i, 620_n$ is established using thirteen (13) of forty-five (45) dummy bytes. For more signalling capacity the dummy bytes #14-45 can be used for future extensibility.

The first twelve (12) dummy bytes transfer signalling information and the $13^{th}$ dummy byte transfers a cyclic-redundancy-check ("CRC") checksum calculated over the preceding 96 bits of signalling information for security and verification purposes. In an example embodiment, the CRC check is an 8-bit CRC checksum, but another redundancy check algorithm can be used instead.

Figure 8:
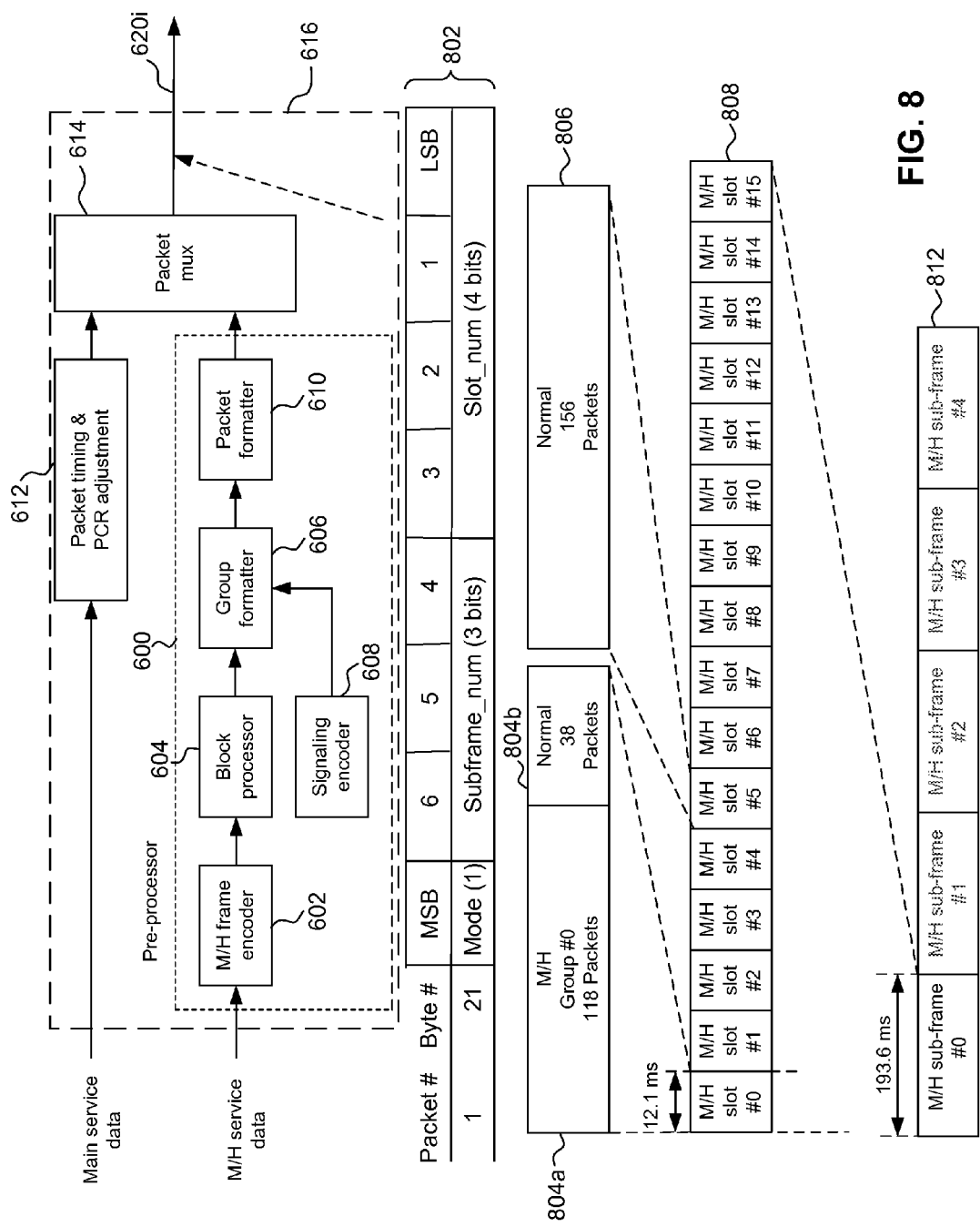
FIG. 8 depicts a pre-processor architecture and MH Frame as well as the basic dummy byte signalling syntax used to enable the alignment of MHE packets to VSB Data Fields and signal a mode in accordance with an embodiment of the present invention.

FIG. 8 depicts the pre-processor architecture 600 described above with respect to FIGS. 6 and 7 as well as the minimum dummy byte syntax 802 needed for MH Frame synchronization. As shown in FIG. 8, packet multiplexer 614 creates five (5) M/H Sub-Frames 812. Each sub-frame contains sixteen (16) slots 808 of 156 TS data packets where each TS data packet has 188 bytes. An M/H Slot may contain 118 data MHE packets with data for M/H receivers (i.e., "M/H Group") 804a and 38 data packets of normal data for stationary receivers (i.e., "normal 38 packets") 804b, collectively 804. Alternatively, a data slot may contain 156 data packets of normal data only (i.e., "normal 156 packets" with data for stationary or "main stream" receivers) 806. Every M/H Group consists of 118 consecutive MHE packets and is formed and assigned the same thirteen (13) bit packet identifier (PID) value by packet formatter 610 located immediately before packet multiplexer 614 in pre-processor 600. The PID value can be a reserved value known to both pre-processor 600 and post-processor $650_1, 650_2, \ldots, 650_i, 650_n$ in advance. Alternatively, the PID value may be a value known only to pre-processor 600, which is discovered and verified by an algorithm in post-processor $650_1, 650_2, \ldots, 650_i, 650_n$.

To start the MH Frame synchronization process, the exciter parses the incoming transport stream received over the STL $620_1, 620_2, \ldots, 620_i, 620_n$ looking at the PID value of every packet. If a reserved PID is in use, and known by exciter, the incoming stream is searched for the reserved PID. When 118 consecutive reserved PID values are found, this indicates discovery of a MH Group.

If the PID value used is known only to the pre-processor 600, a discovery algorithm is performed by the exciter. The exciter parses the incoming stream and looks for any PID value that is present in 118 consecutive packets in the incoming stream. Once 118 consecutive packets with the same PID are found, the first two (2) packets are treated as MHE packets and the CRC checksum from $13^{th}$ byte is used to verify that 118 consecutive packets are truly a MH Group. If CRC checksum is correct, it means that the MH Group (and the PID being used) has been discovered and verified by the exciter.

Packet multiplexer 614 inserts signalling bits into the first two MHE packets of every MH Group in spaces normally occupied by dummy bytes. Once the exciter post processor $650_1, 650_2, \ldots, 650_i, 650_n$ discovers and verifies the MH Group, the signalling syntax 802 carried in the twelve (12) dummy byte positions is used. In one embodiment, before the signalling data carried in the MHE packets reaches data randomizer $652_1, 652_2, \ldots, 652_i, 652_n$, a processor (or other control logic) extracts the signalling data and resets the corresponding fields with dummy bytes (e.g., resets the element values to a value of 0xAF (hex)).

The first thirteen (13) dummy bytes of an M/H Group are thus modified to create a point to point signalling channel. FIG. 8 shows a portion of syntax 802 used to signal to the exciter for MH frame synchronization. The full syntax with signalling for SFN Timing, etc., is shown for corresponding packet/byte pairs (902/904) in more detail in FIG. 9. The signalling information is carried in the first two (2) MHE packets of an ATSC M/H Group, and includes the following syntax and semantics:

Mode (1 bit) 906: indicates control information for switching exciters from a first operation mode, in which data for both stationary and mobile receivers are transmitted, to a second operation mode, in which only data for stationary receivers are transmitted. When in ATSC SFN M/H mode, this mode bit is used to signal a mode change from ATSC SFN M/H mode to normal ATSC SFN mode (i.e. no mobile data). In an example embodiment, the Mode field 906 is set to '0' only during the last M/H Frame before the M/H mode ends, otherwise it is set to '1'. This allows the head end (e.g., from M/H multiplexer 614) to signal the exciter that the next M/H Frame will begin an ATSC SFN normal mode. This also signals the appearance of a VSB synchronization packet (VSP) in the next M/H Frame to be used for VSB framing and trellis initialization for SFN operation in normal ATSC SFN mode. The exciter will also set the enhanced mode bits in the Data Field Sync ("DFS") signal that the normal ATSC mode is being used.

subframe_number (3 bits) 908: Provides implicit signalling of a MH sub-frame number, indicating the current sub-frame number (0-4) within the M/H Frame carrying these signalling bits.

slot_number (4 bits) 910: Provides implicit signalling of MH slot number indicating the number of the current slot (0-15) within the M/H Sub-Frames carrying these signalling bits.

Figure 1:
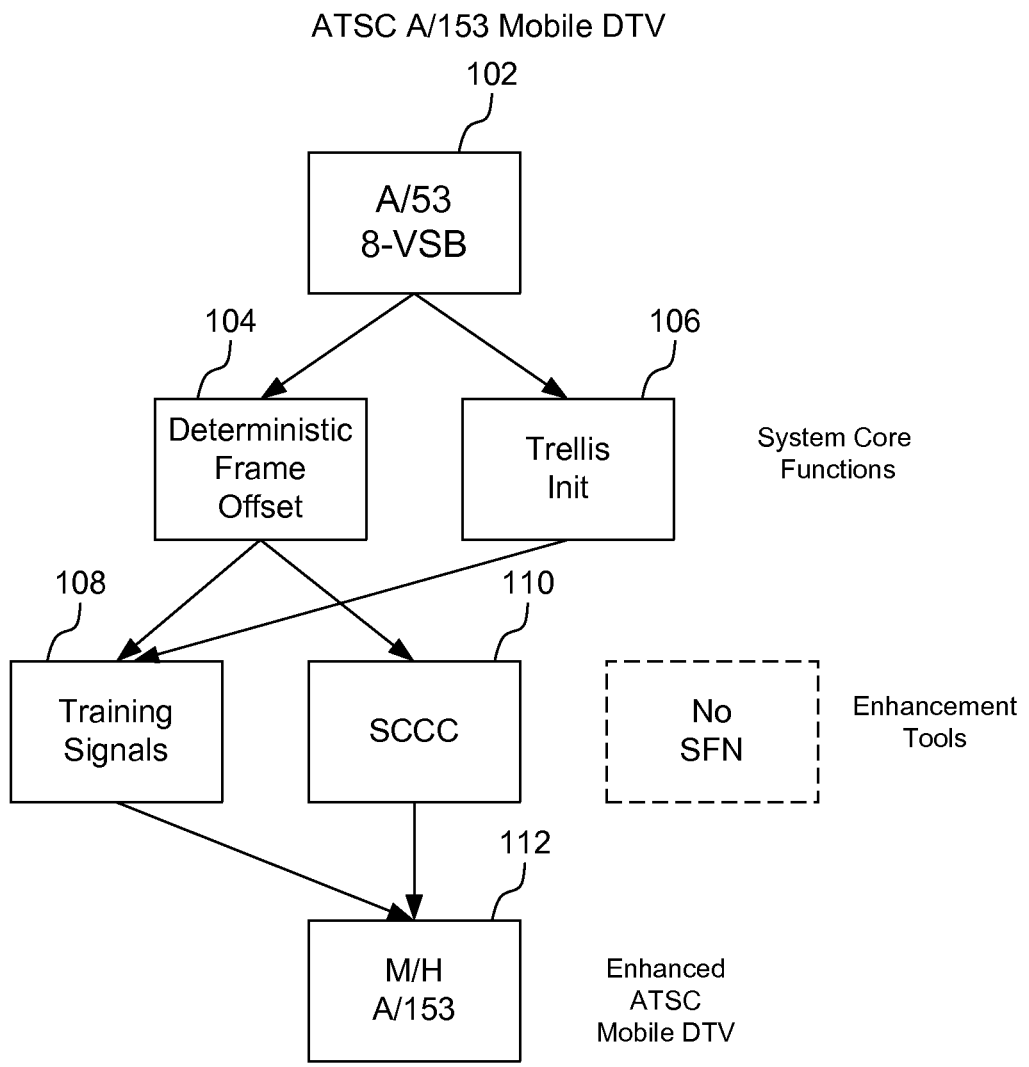
FIG. 1 depicts the system core functions and enhancement tools that have been added to the A/53 standard to form the A/153 candidate standard.
Figure 2:
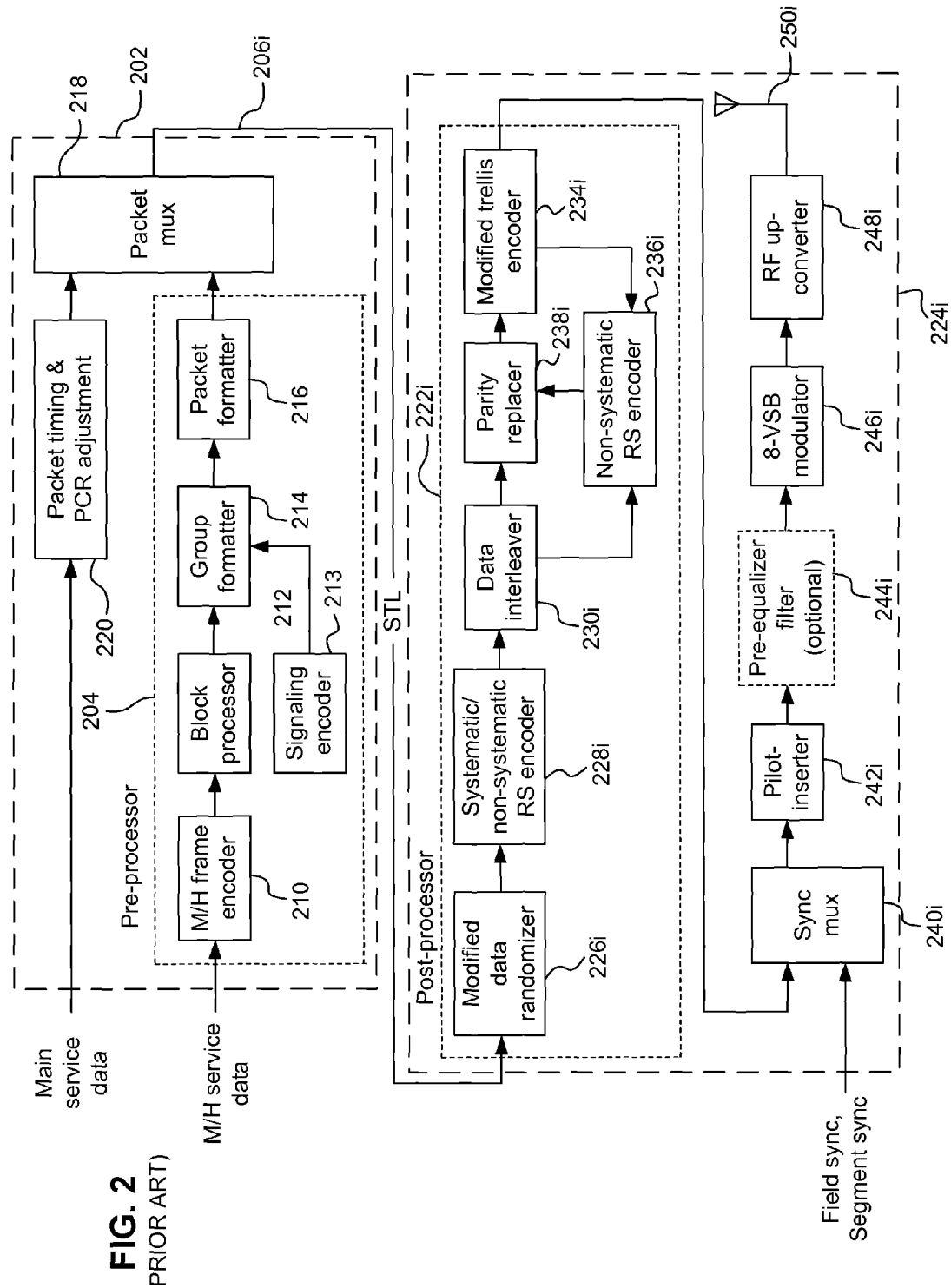
FIG. 2 depicts a block diagram of an ATSC M/H transmission system.
Figure 3:
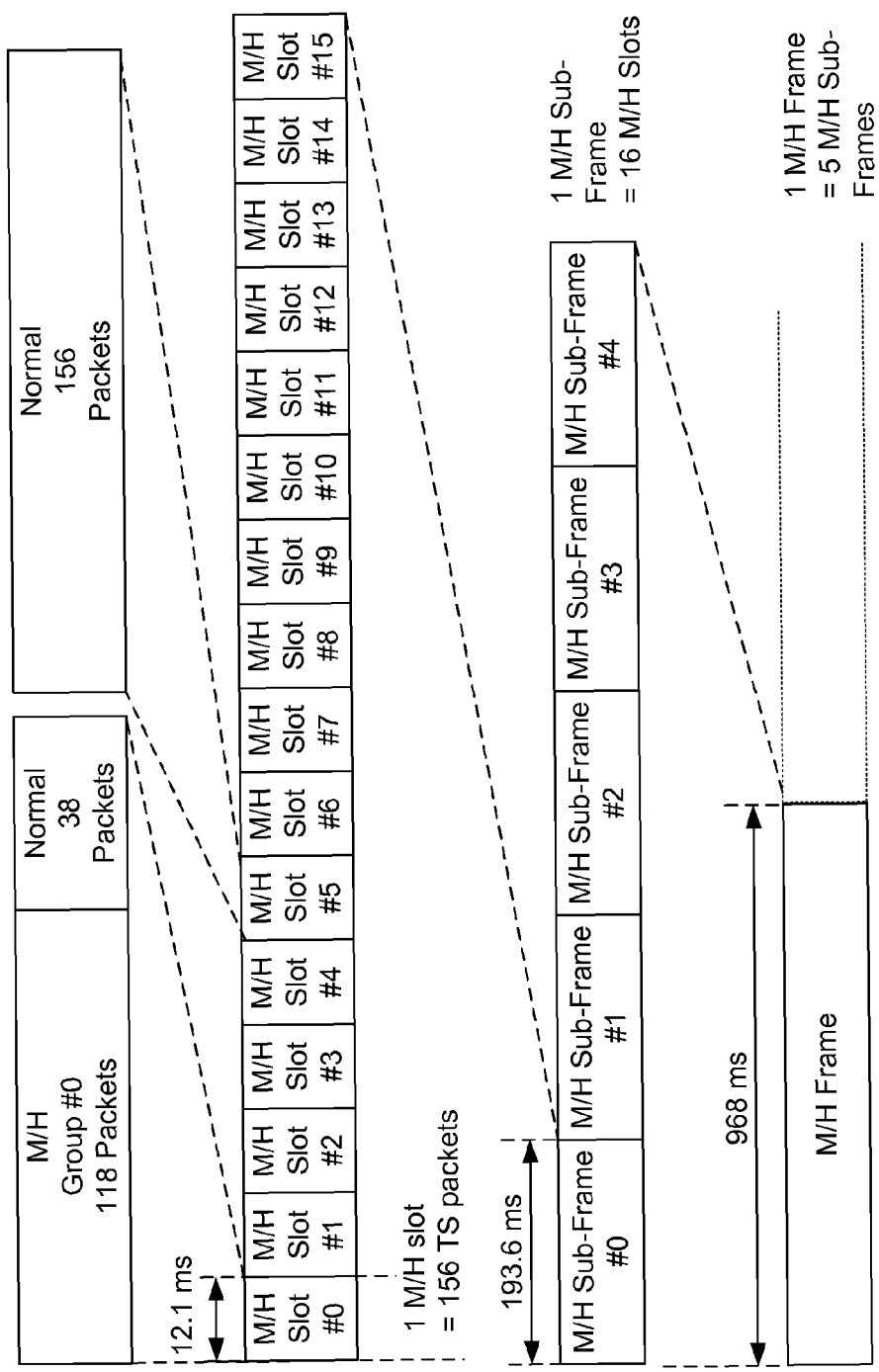
FIG. 3 depicts the structure and individual components of an M/H Frame according to the A/153 candidate standard.
Figure 4:
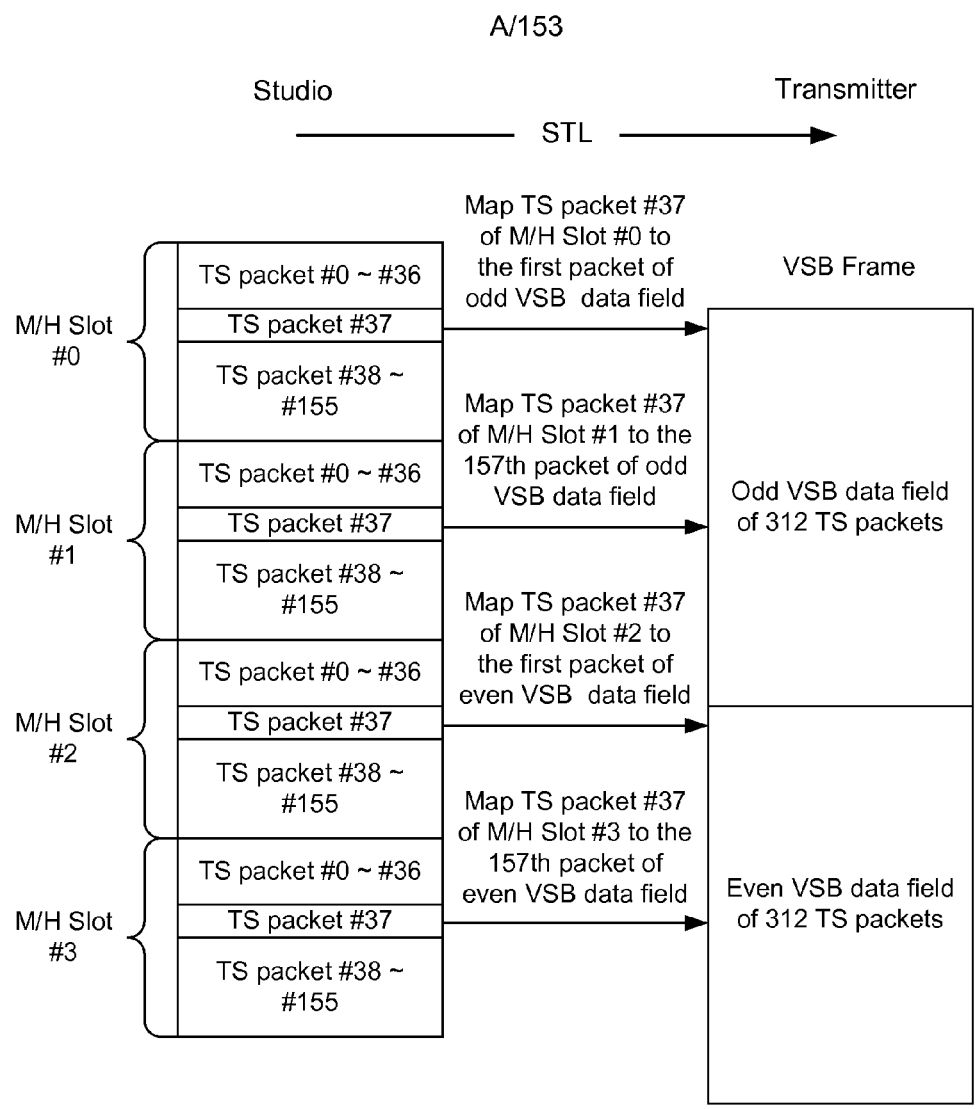
FIG. 4 depicts a mapping of received ATSC M/H packets to positions in an 8-VSB data field.

By signalling the current sub-frame number (0-4) and slot number (0-15) the post-processor $650_1, 650_2, \ldots, 650_i, 650_n$ can align the MHE packets to proper VSB data field with the proper offset described above with respect to FIG. 4, thus making MH frame synchronization possible. MH frame synchronization for this enhanced SFN 502 is shown in FIG. 5 by the dashed arrow pointing from deterministic frame offset 104 towards SFN 502.

sync_time_stamp (24 bits unsigned) 912: In an SFN, this value indicates the elapsed time, measured in 100 ns increments, between a 1-second tick of a GPS seconds reference clock and the release from an M/H multiplexer of the first bit of a M/H encapsulation ("MHE") packet into the distribution network (i.e., STL). This time stamp is compared with a local GPS reference at the exciter to enable the actual path time delay through the STL to be calculated. The result is then used in part to set size of FIFO buffer in the exciter.

max_delay (24 bits) 914: A value that is selected to be larger than the longest path delay in the distribution network (STL) to all exciters in a SFN and indicates a delay value from 0 to 1 second in 100 nanosecond increments. This value is used with the calculated path time delay through STL at site to set the size of FIFO buffer in each exciter individually in SFN. By using the following equation:

$$\text{max delay(ns): STL path delay(ns)=size FIFO buffer (ns)} \quad (1)$$

This enables the same TS packets to be sent over the STL and be removed from the FIFO at the same time independent of the different time delays experienced by the packets over STL to each transmitter in SFN.

It should be understood that the time references described above at headend needed for SFN can be derived from a GPS receiver 1PPS or alternatively by an NTP (network time protocol) from an NTP server as described in German Patent Appln. DE102008031796.9, which is hereby incorporated herein by reference in its entirety.

System_time (2 bits) 916: indicates the status of ATSC system time (more commonly referred to as "ATSC Time") described in U.S. patent application Ser. No. 12/024,238, which is hereby incorporated herein by reference in its entirety. When set to '11', ATSC Time is not active. When set to '00', ATSC Time is active and a release of M/H Frame is in cadence with a GPS/ATSC Epoch. When set to '01', ATSC Time is active and adjusted_GPS_seconds_count is used to send the GPS seconds count to an exciter. When set to '10', ATSC Time is active and the GPS (seconds) count is available at the exciter and therefore adjusted_GPS_seconds_count is not sent.

MTxID (1 bit) 918: when set to '1', the MTxID is On; when set to '0', MTxID is Off.

MTxID_MH_Frame_Align (2 bits) 920: a counter (started at '00' at Epoch) that cycles (00,01,10,11) and indicates a known offset of MTxID to the start of a M/H Frame. When MTxID_MH_Frame_Align is equal to '00', it indicates that MTxID and the M/H Frame have the same alignment at Epoch; all other counts have a known offset. This enables exciter to start MTxID with a correct phase relative to a start of M/H Frame.

An MTxID data block contains 32 fields and an M/H Frame contains 40 fields. A starting offset needs to be calculated from an epoch and signaled to an exciter which in turn inserts the MTxID in the correct phase.

Reserved (3 bits) 922: all reserved bits set to '1'.

adjusted_gps_seconds_count (32-bit unsigned integer) 924: This field preferably contains the value of the globally available GPS seconds count, at the instant of release of the first MHE packet from M/H multiplexer 600. When the sum of the values of the synchronization_time_stamp and maximum_delay is less than 10,000,000 the current value of globally available GPS seconds count is sent in MHE packet. When the sum is greater than 10,000,000, the currently available GPS seconds count shall be incremented by one (+1) before sending in MHE packet. This is only used in ATSC Time when a GPS seconds count is not available at the exciter.

CRC-8 (8 bits) 926: a CRC-8 calculated over all 96 preceding bits of dummy byte signalling data.

IV. M/H Deterministic Trellis Initialization (SFN)

Figure 10:
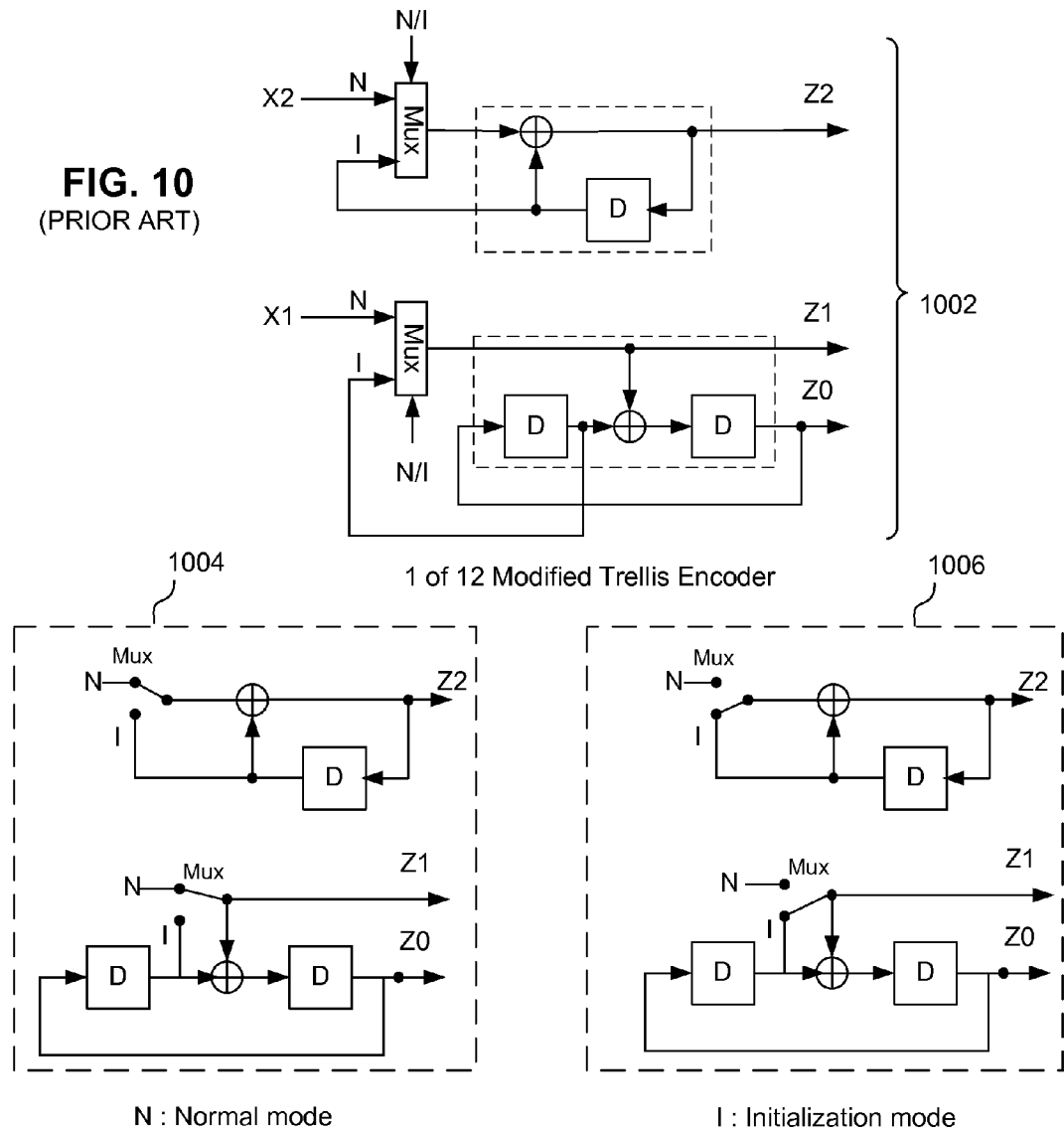
FIG. 10 depicts 1 of 12 modified trellis encoders that can be set to a normal mode or an initialization mode according to the ATSC A/153 candidate standard, which are leveraged in accordance with an embodiment of the present invention.

FIG. 10 depicts 1 of 12 modified trellis encoders 1002. Each encoder includes a multiplexer to switch between a normal ("N") input mode 1004 and an initialization ("I") input mode 1006 which is fed back from the delay devices within the trellis encoder. A normal/initialization control input to the multiplexer is used to select the initialization input path when initialization is required. Particularly, the normal/initialization control input selects the initialization path during the leading 2-symbol interval (4 bits) of each respective (1 of 12) trellis initialization bytes to synchronize (1 of 12) respective trellis codes to a zero state. This permits pre-calculated training signal (FIG. 5, 108) data values to be inserted into the trellis encoder immediately after trellis initialization, resulting in known and repeatable training signal symbol sequences being produced by the modified trellis encoders. The multiplexer selects the normal path at all other times. The trellis initialization circuit shown in 1002 can also be used to enable synchronization of all trellis encoders in all exciters to support creating an SFN, as illustrated in FIG. 5 by a dashed arrow pointing from trellis initialization 106 towards SFN 502.

The use of the basic core function trellis initialization 106, for producing coherent symbols from multiple exciters in digital RF transmitters (i.e., in an SFN), will now be described. Referring again to FIG. 10, with the Mux of a trellis encoder in the initialization mode 1006, both inputs of the exclusive OR (XOR) gates are forced to the same logic value, particularly a logic zero (0) output from XOR independent of logic input, as shown in the XOR truth table 1008. Since the two D memory latches are in series in the Z0 path, two symbol clock cycles are required to initialize the state of trellis encoders. Thus, to initialize the three D memory latches all to a common zero (0) state, the initialization line ("I") on multiplexer is enabled for two symbol clock periods. This occurs as the first 4 bits (i.e., 2+2) from each initialization byte first enter the respective trellis encoder as will be explained. This forces both inputs of the exclusive OR gate to a common logic level to produces a zero (0) output independent of the current state. All three D memory latches will assume a zero (0) output state after two symbol clock periods in initialization mode.

Figure 11:
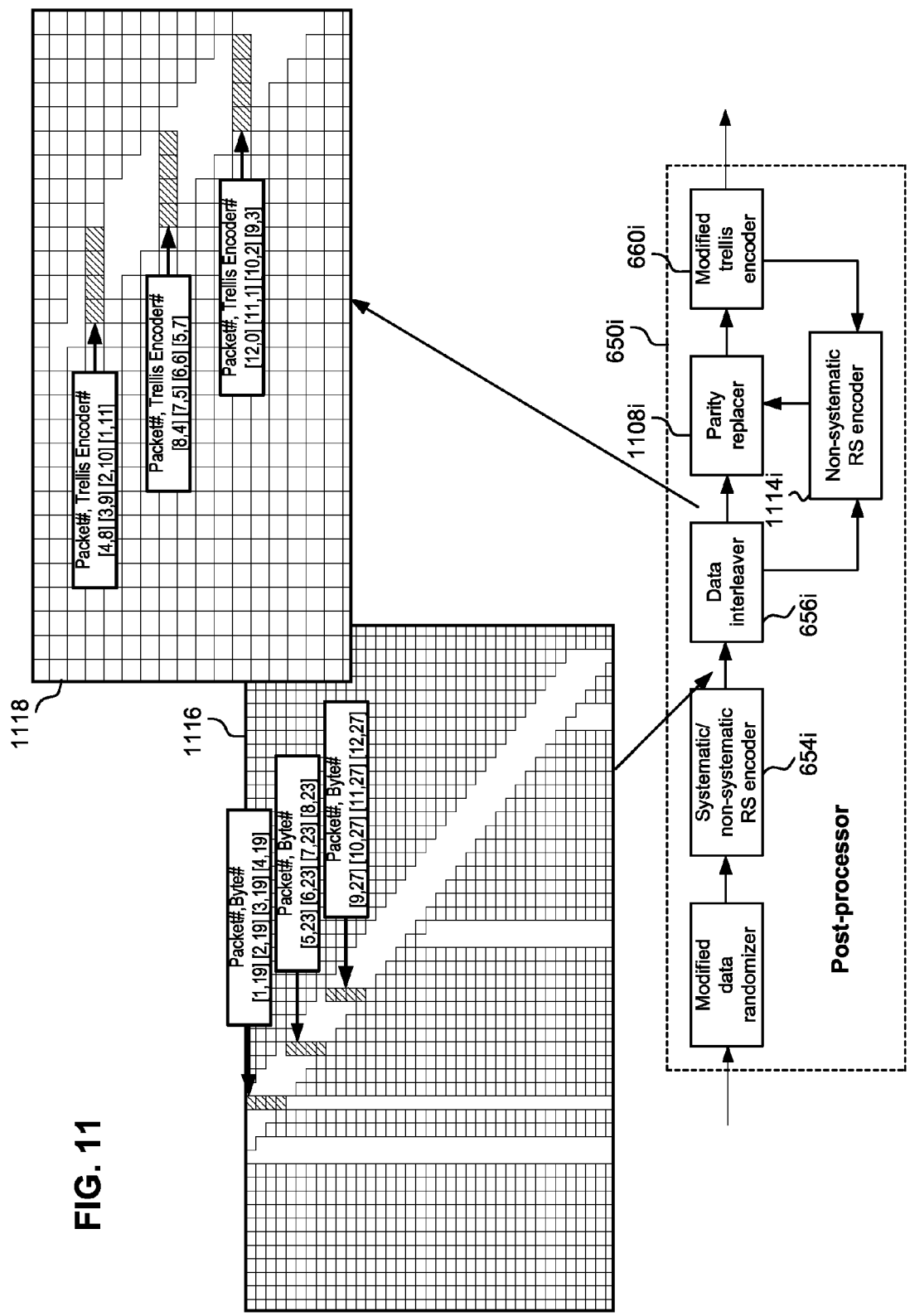
FIG. 11 depicts the input before and output after the ATSC-52 segment continuous convolutional byte interleaver showing the select 12 packets (each having a single trellis initialization byte) to be used for ATSC M/H SFN in accordance with an embodiment of the present invention.

Selection of the 12 trellis initialization bytes which will be used for MH SFN will now be described with reference to FIGS. 6 and 11. FIG. 11 depicts the post-processor $650_1$, $650_2, \ldots, 650_i, \ldots, 650_n$ in the MH exciter, when a 118 MHE packet (MH Group) is processed by the non-systematic RS encoder. Twenty (20) non-systematic RS parity bytes are generated for each MHE packet and placed in pre-determined locations within the MHE packet defined by the A/153 candidate standard. The MHE packet payload data (i.e., mobile data) is of no use to a normal ATSC receiver. Thus, a PID assigned the MHE packet is not recognized as a normal ATSC service and the MHE packets are simply ignored by an ATSC receiver. This ensures legacy backward compatibility. The output of the non-systematic RS encoder $654_1, 654_2, \ldots, 654_i, \ldots, 654_n$, before the data interleaver $656_1, 656_2, \ldots, 656_i, \ldots, 656_n$, mapping is shown in 1116 with the twelve (12) MHE packet/byte pairs selected (e.g., 1/19, 2/19, 3/19, 4/19, 5/23, 6,23, 7/23, 8/23, 9/27, 10/27, 11/27, 12/27) for SFN trellis initialization. Each select byte from a packet/byte pair has been identified a priori before data interleaver $656_1$, $656_2, \ldots, 656_i, \ldots, 656_n$ and will enter a respective (1 of 12) trellis encoder $660_1, 660_2, \ldots, 660_i, \ldots, 660_n$ as shown in mapping 1118 later in the post processing, at which time trellis initialization is conducted on the first 4 bits of each initialization byte shown in mapping 1116. With the Mux of trellis encoder $660_1, 660_2, \ldots, 660_i, \ldots, 660_n$ in the initialization mode, both inputs of the exclusive OR (XOR) gates are forced to the same logic value this produces a logic zero (0) output from XOR independent of logic input as shown in logic table 1008 (FIG. 10). To initialize the three D memory latches to a common zero (0) state, the initialization line ("I") on multiplexer is enabled for two symbol clock periods. This occurs on the first 4 bits (2 bits per symbol) from each initialization byte as they enter a respective trellis encoder.

This trellis initialization causes all trellis encoder states to be set to the same zero state at the same time, in each exciter in the SFN network. This will then produce coherent symbols from all transmitters (given the VSB Data Frames are synchronized and all exciters are receiving the same data stream over the STL), which is a requirement for an SFN.

The twelve (12) trellis initialization bytes selected are non-systematic RS parity bytes from twelve (12) MHE packets. Using a RS parity byte for trellis initialization reduces the number of non-systematic RS parity bytes from 20 to 19 (i.e., 1 byte is used trellis initialization) only over these twelve (12) MHE packets of MH Group #0, sub-frame #0, slot #0 once per MH frame (every 12,480 packets). This will cause a very small reduction of approximately 0.2 dB in RS error correction capability for just these 12 MHE packets alone approximately once per second. As described above, these and all MHE packets are discarded by legacy ATSC receivers (not shown). The non systematic RS parity is not used by MH mobile receivers. Thus, the reduction of parity bytes will not materially effect mobile services.

Figure 12:
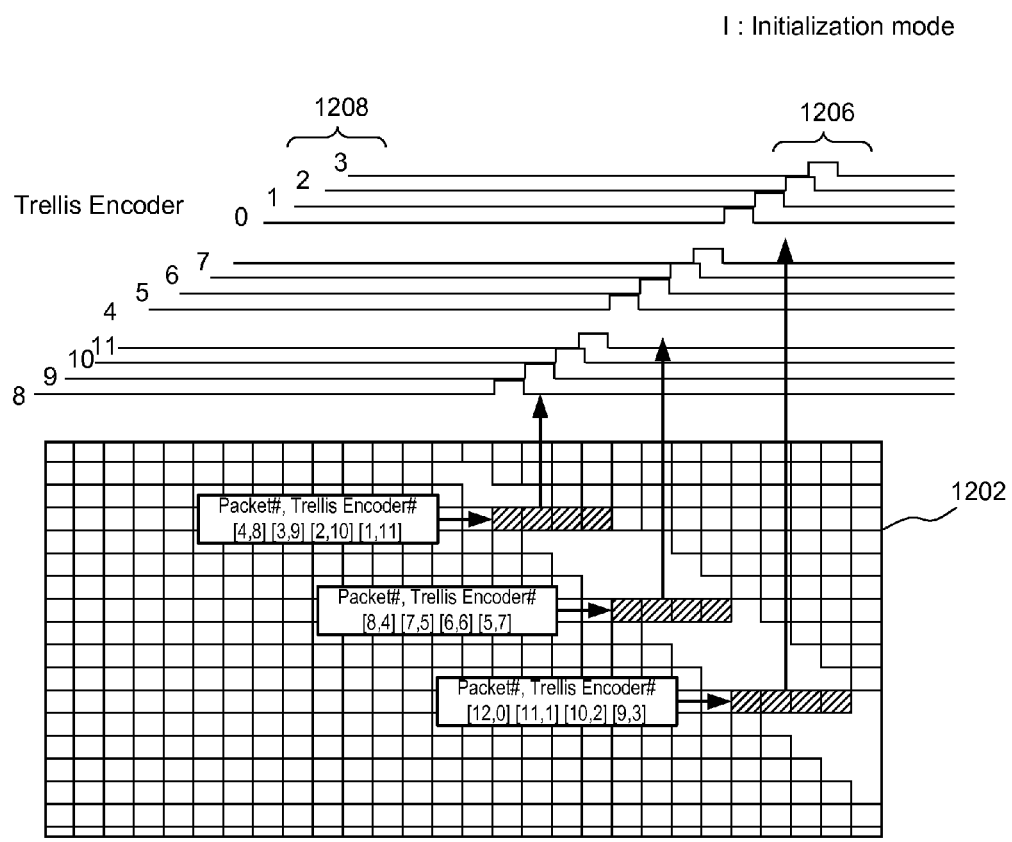
FIG. 12 illustrates the output of an ATSC 52-segment continuous convolutional byte interleaver and a timing diagram showing the instant each 1 of 12 initialization bytes enters 1 of 12 trellis encoders and the initialization mode is active for two symbol clock cycles or 4 bits of symbol data, in accordance with an embodiment of the present invention.

FIG. 12 illustrates exemplary initialization of trellis encoders 0-11 (1208) according to an embodiment of the present invention. As shown in FIG. 12, twelve initialization bytes shown in mapping 1202 are activated upon by a rising edge of the initialization ("I") mode control signal 1206 as each initialization byte enters a respective (1 of 12) trellis encoder $660_1, 660_2, \ldots, 660_i, \ldots, 660_n$ as described above with respect to FIGS. 10 and 11.

V. Normal Mode VSB Frame Synchronization (SFN)

When a station is operating with ATSC A/153 MH content in an SFN, the dummy byte signalling (i.e., VSB Frame Synchronization) and non-systematic RS parity bytes (trellis initialization) as described above are used to establish and maintain the synchronization in SFN. However, if a station desires to stop transmission of all MH mobile content (i.e., returns to normal A/53 mode) maintaining SFN in normal mode, a different mechanism in accordance with an embodiment of the present invention, is used. This aspect of the present invention is used because the dummy bytes and non-systematic RS parity bytes are only available when the station is broadcasting ATSC A/153 MH data.

Figure 13:
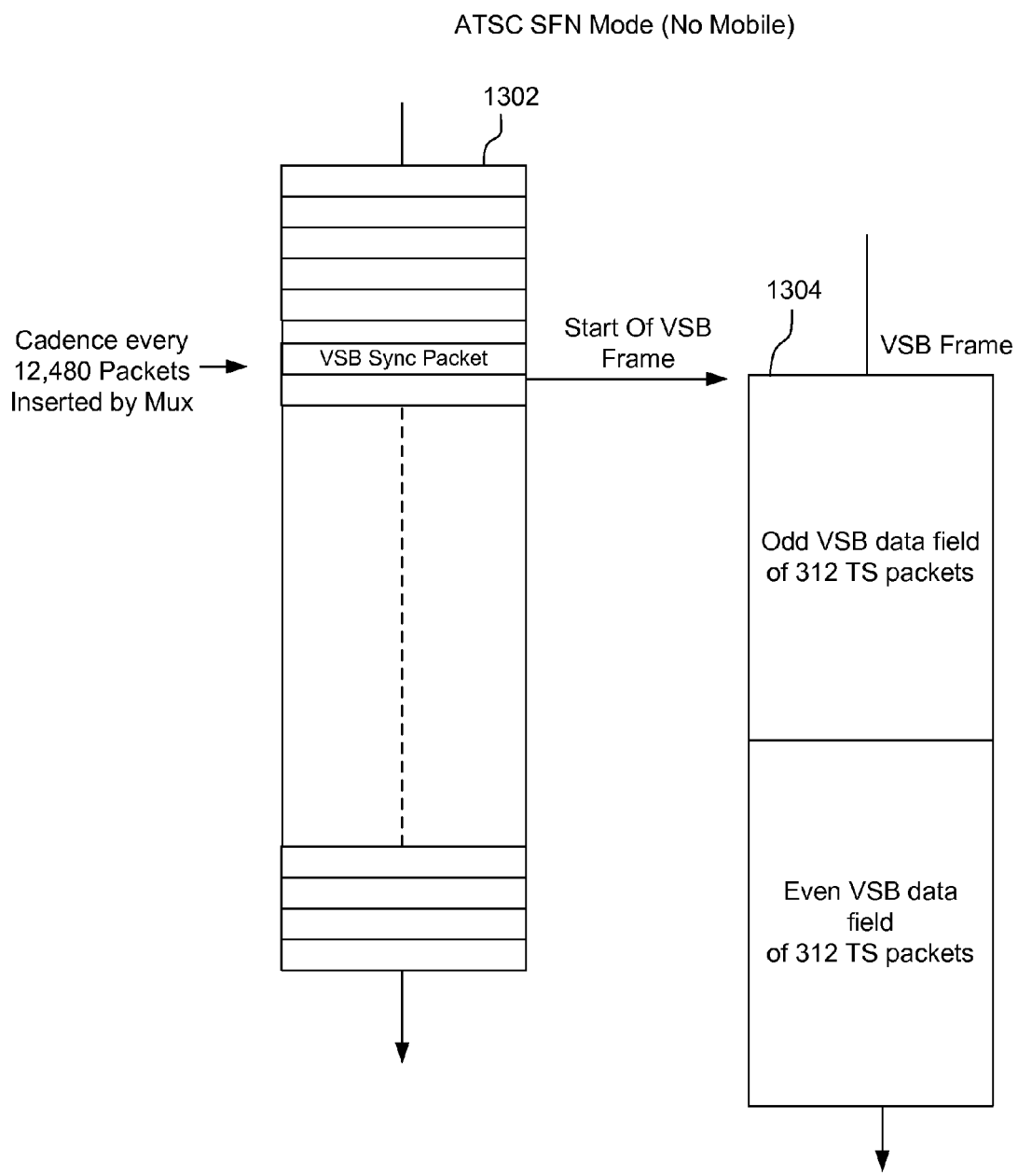
FIG. 13 depicts mapping of a VSB synchronization packet to a VSB frame in an ATSC SFN (i.e., without mobile data) in accordance with an embodiment of the present invention.

FIG. 13 depicts the mapping of a VSB synchronization packet ("VSP") 1302 sent over an STL to a A/53 VSB frame 1304 generated in the exciter in accordance with an embodiment of the present invention. In one embodiment, shown in FIG. 13, a VSP is transmitted to all exciters in the SFN once every 12,480 packets, which defines the cadence (i.e., 20 VSB frames exactly equal to the length of a MH frame). In this example, a single VSP is sent as the last packet of the 12,480 packet cadence and its appearance in TS defines the start of a VSB frame, as shown in FIG. 13. Preferably, the first packet after the VSP will be mapped as the first packet of an odd VSB data field. Thus, the cadence is the same in both MH SFN mode and normal SFN mode, which improves the switching between modes. The VSP also can be locked to an ATSC system time epoch.

Referring briefly to FIG. 15 the syntax of a VSP is illustrated. As shown in FIG. 15, a VSP includes a packet identifier ("PID") 1504. In accordance with an example embodiment of the present invention, PID 1504 is used to identify a VSP in the transport stream. The PID value can be identified by using a reserved PID value which is known between MH multiplexer at studio and exciter. Alternatively, the PID value can be a null packet (e.g., 0x1FFF) or any undefined PID. The discovery algorithm and verification methods for both cases is described below.

FIG. 14 depicts a memory map of an ATSC 52-segment continuous convolutional byte interleaver 1414 showing the time dispersion of VSB synchronization packet ("VSP"). As shown in FIG. 14, a VSP 1408 contains a header 1402 followed by signalling data 1404. The header section 1402 contains a 13 bit VSP PID. If a reserved PID is used, the exciter will discover this by parsing the incoming TS sent over STL until it finds the reserved PID value in a packet. In an example embodiment, the reserved PID value is sent once every 12,480 packets.

Once the reserved PID value has been located within the TS, the exciter calculates the CRC 32 checksum 1410 carried at the end of the received packet to verify that it is a VSP. The exciter will then find the VSP PID value once every 12,480 packets because the MH multiplexer is generating this cadence which the exciter then slaves to. As described above with regard to FIG. 13, the VSP is then aligned 1304 and the next packet following the VSP will start an odd VSB data field.

If a Null packet or an undefined PID value is used for a VSP, these can appear multiple times in a 12,480 packet cadence. To discover the PID value, the exciter parses every incoming packet and calculates the CRC32 checksum assumed to be carried in last four (4) bytes of all packets. When the Checksum is found to be correct this indicates this is the VSP. The exciter will then find this VSP PID value every 12,480 packets and the CRC32 checksum is checked and found to be correct. This gives confidence the exciter is synchronized with cadence. As described above with regard to FIG. 13, the VSP is then aligned 1304 and the next packet following VSP will start an odd VSB data field. The undefined PID or Null packet may occur several times during cadence interval, but will have VSP Syntax only every 12,480 packets. Either of the above VSP discovery methods may be used to provide more system flexibility in operation.

VI. Normal Mode Deterministic Trellis Reset or Initialization (SFN)

In normal mode SFN it is also necessary to synchronize the trellis encoder memories of all exciters in a SFN to a common zero state at specific points in time in the data stream simultaneously by all exciters in a SFN. In another embodiment, a deterministic trellis reset (DTR) or initialization byte is used to perform trellis encoder synchronization. The VSP 1408 has twelve (12) pre-determined byte (DTR) positions 1406. Each byte will be used to initialize (1 of 12) trellis encoders when the byte first enters the respective (1 of 12) trellis encoder.

Trellis encoder synchronization is accomplished based on a priori knowledge of the location of the interleaved VSP packet DTR bytes at the output of data byte interleaver before the trellis encoder stage. With the knowledge of the time dispersion of VSP at the output of the ATSC interleaver (once the data frame synchronization data has been achieved and the same data is being sent over STL to all exciters), twelve (12) predetermined byte positions 1406 in VSP are identified and used to trigger a DTR or initialization in each of the twelve trellis encoders in all of the exciters in the SFN. The initialization occurs as soon as each of these deterministically assigned bytes enters its designated trellis encoder. This will then cause Coherent symbols to be produced from all transmitters in the SFN.

The diagonal arrows in FIG. 14 shows the time dispersed positions assumed by bytes of the VSP 1412 in the interleaver. The four (4) bytes selected and marked (DTR) on each of the three diagonal sections show that these fixed position VSP bytes 53-56, 105-108, 157-160 will each be delivered deterministically to one of the twelve (12) trellis coders numbered 5, 2, 11, 8; 9, 6, 3, 12; 1, 10, 7, 4, respectively, when they exit the interleaver memory. This allows the timing in the exciter to be designed to enable a deterministic trellis initialization 1006 to a zero state to occur over the first 4 bits of each DTR or initialization byte when each byte first enters the respective 1 of 12 trellis encoder.

This initialization will occur in a serial fashion over four (4) segments in every exciter and effectively synchronizes all twelve (12) trellis coders in all exciters in a deterministic fashion. Twelve (12) RS parity errors will occur on every VSP by the action of the trellis initialization on the twelve designated DTR bytes. This will not affect any packet carrying normal content. The VSP, which is identified as a reserved or undefined PID is not used for any purpose by normal ATSC receivers and will be ignored. As used for purpose of SFN the parity errors generated by trellis Initialization function 1006 are not corrected by RS parity re-encoding $1114_1$, $1114_2$, . . . , $1114_i$, $1114_n$ and parity replacer $1108_1$, $1108_2$, . . . , $1108_i$, $1108_n$ as is described in the A/153 candidate standard when trellis initialization is used for purpose of generating known training signals.

FIG. 15 depicts the syntax for a VSB synchronization packet ("VSP"), in accordance with an embodiment of the present invention. The normal ATSC header 1504 has a thirteen (13) bit packet identifier (PID) which can be a reserved PID value, or an undefined freely assigned PID value that is assigned by the M/H multiplexer and sent over an STL and discovered downstream in an exciter. In addition to the normal ATSC header 1504 the VSP includes the following syntax and semantics:

The Mode (1 bit), System Time (2 bits), and Reserved (5 bits) fields 1506 have the following semantics:

Mode: used to signal a mode change from normal ATSC mode to ATSC M/H mode. In one example embodiment, the mode bit is set to '0' only during the last two (2) (Two) VSPs before the normal mode ends; otherwise it is set to '1'. The M/H service multiplexer at the head-end provides signalling to an exciter that a transition to ATSC M/H mode will begin. This signalling also indicates that 118 consecutive MHE packets used for VSB Framing and trellis initialization for SFN operation in ATSC M/H mode will soon appear. In addition, this signalling also causes the exciter to set enhanced mode bits in a Data Field Sync to signal to receivers that the mode is ATSC M/H.

System_time (2 bits): indicates the status of ATSC Time described in U.S. patent application Ser. No. 12/024,238, which is hereby incorporated herein by reference in its entirety. When set to '11', ATSC Time is not active. When set to '00', ATSC Time is active. When set to '01' ATSC Time is active and adjusted_GPS_seconds_count is used to send the GPS seconds count to an exciter. When set to '10', ATSC Time is active and the GPS Seconds count is available at exciter in which case adjusted_GPS_seconds_count is not sent.

Reserved (5 bits): remaining bits are reserved and set to '1'.

sync_time_stamp (24 bit unsigned integer) 1508: a field that indicates the elapsed time, measured in 100 ns increments, between a 1-second tick of the GPS (seconds) reference clock and the release from the M/H multiplexer (of the first bit of VSP Packet into the distribution network (i.e., STL).

max_delay (24 bit) 1510: a value that is selected to be larger than the longest STL delay path in the distribution network and indicates a delay from 0 to 1 sec in 100 ns increments.

adjusted_gps_seconds_count (32-bit unsigned integer) 1512: a field that shall contain the value of the globally available GPS seconds count at the instant of release of VSP packet from M/H multiplexer 600. When the sum of the values of the synchronization_time_stamp and maximium_delay fields in 100 ns increments is less than 10,000,000 (or 1 second) the current value of globally available GPS seconds count is sent in VSP packet. When the sum is greater than 10,000,000 the currently available GPS seconds count shall be incremented by one (+1) before sending it in a VSP. This is only used in ATSC Time when a GPS seconds count is not available at the exciter.

DTR (32-bits) 1514-1518: provide a deterministic trellis reset (DTR) or initialization bits used to perform trellis encoder synchronization. In a preferred embodiment, these bits are set to '1'.

CRC_32 (32 bits) 1520: the CRC checksum is calculated over all VSP bytes other than the DTR and is placed at the end of the VSP. When the exciter receives the VSP it calculates a CRC-32 checksum in same manner and compares with CRC-32 in VSP. If the values are the same this verifies no data errors have occurred and this is a VSP. If the checksum do not match an error in data has occurred or this is not a VSP. In a preferred embodiment, the remaining unused bytes/bits 1522 are reserved and set to '1'.

It is immaterial where the above signalling is carried within a VSP. Accordingly, it should be understood that the above syntax can be carried in various locations and still be within the scope of the present invention.

VII. Switching between ATSC Modes in SFN

During ATSC A/153M/H (Mobile) operation, a broadcaster may want to switch the M/H mode off and operate in normal ATSC A/53 mode (i.e., no mobile data), while maintaining the SFN. Accordingly, mode switching under SFN operation must be supported. As explained above with reference to the MHE and VSP syntax, a mode element signals a mode change.

Figure 16:
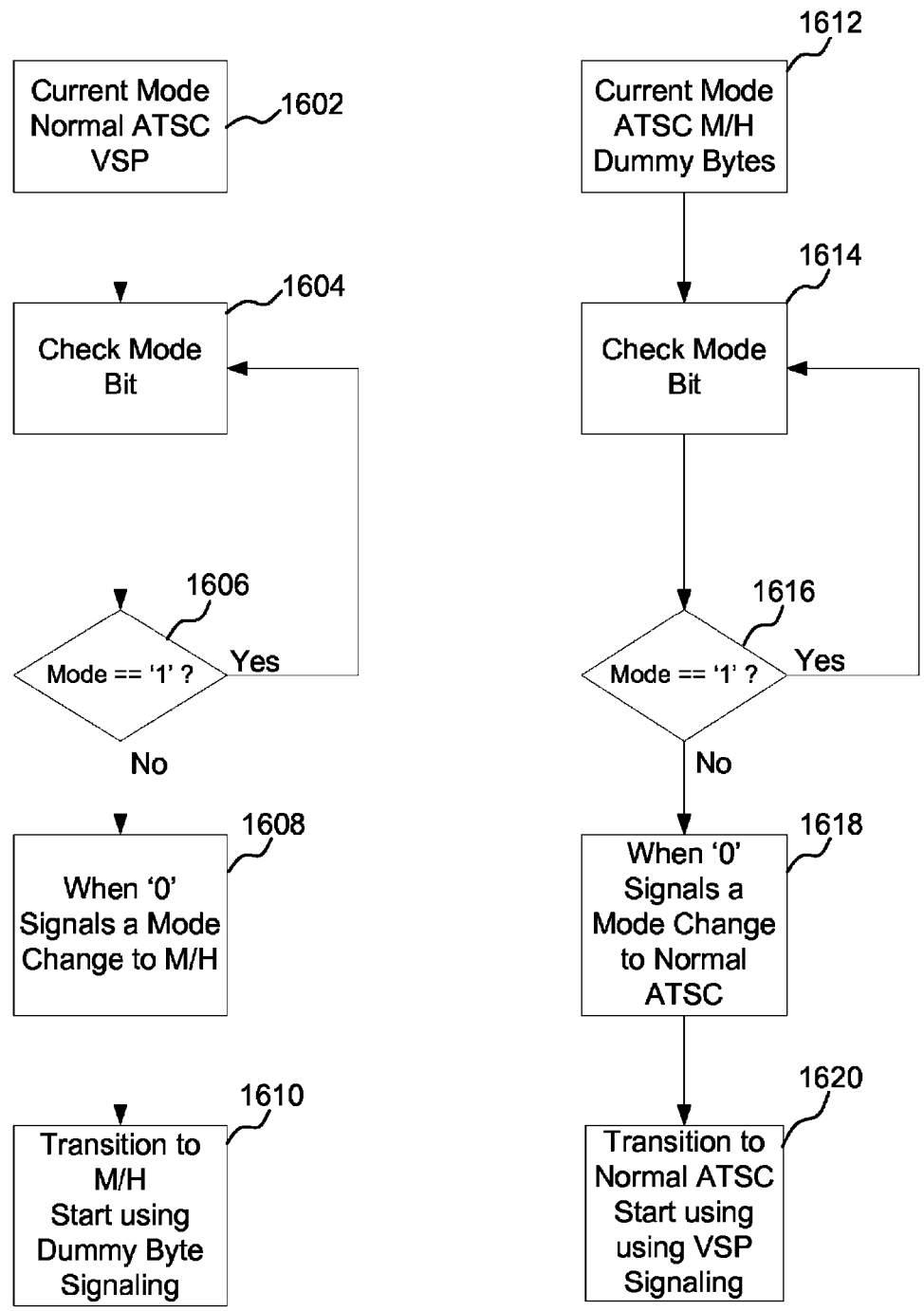
FIG. 16 depicts two flowcharts showing processes for transitioning between normal ATSC SFN (i.e., without mobile data) and ATSC SFN M/H modes in accordance with an embodiment of the present invention.

FIG. 16 depicts two flowcharts showing processes for transitioning between modes, particularly from a normal ATSC mode without M/H services using the VSP for SFN synchronization to an ATSC mode with M/H services using the MHE packets and non-systematic RS parity bytes for SFN synchronization, and vice versa. As shown in block 1602, the current mode is the normal ATSC mode, which uses VSP to provide SFN synchronization. In block 1604, the Mode bit is checked by the exciter to determine whether it has been set to '0' to signal a mode change from normal ATSC mode to ATSC M/H mode.

If the Mode bit is set to '0', this signals to the exciter that the next 20 VSB Frames will correspond to the ATSC M/H mode and that MHE packets that are used for SFN operation in ATSC M/H mode will soon appear. If a determination is made at block 1606 that the Mode bit is set to '1', then it will loop back to block 1604. However, if a determination is made at block 1606 that the Mode bit is set to '0', then block 1608 signals this to the exciter that the next M/H Frame will correspond to the ATSC M/H mode and that MHE packets are used for signalling and VSB framing and non-systematic RS parity bytes will be used for trellis initialization for SFN operation in ATSC M/H mode will begin. It also signals to the exciter to set enhanced mode bits in a Data Field Sync to signal to receivers that the mode is ATSC M/H mode. As shown in block 1610, the exciter is now prepared to transition to ATSC M/H mode and use dummy byte signalling.

When switching from an SFN ATSC M/H mode to a SFN normal ATSC mode (i.e., no M/H services), the syntax including dummy bytes will cease to exist. Block 1612 illustrates that the current mode is the ATSC M/H mode, which uses dummy bytes to provide frame synchronization. Block 1614 checks the Mode bit to determine whether it has been set to '0' to signal a mode change from ATSC M/H mode to normal ATSC mode. If the Mode bit in the last M/H Frame before the M/H mode ends is set to '0', this signals to the exciter that the next 20 VSB Frames will correspond to the ATSC normal mode and that a VSP will appear for VSP framing and trellis initialization for SFN operation in ATSC normal mode. This also signals an exciter to set the enhanced mode bits in a Data Field Sync to signal normal ATSC mode to receivers. Accordingly, block 1616 makes a determination if the Mode bit is '1'. If so, then the process loops back to block 1614 indicating that the mode is still in ATSC M/H mode. If, however, block 1616 makes a determination that the Mode bit is '0', then the process proceeds to block 1618, where a signal is communicated to the exciter(s) that the mode is transitioning to the normal ATSC mode. As shown in block 1620, the exciter is now prepared to transition to normal ATSC mode and use VSP signalling which appear in TS.

The example embodiments of the invention described above, including their procedures, part(s) or function(s) thereof, may be implemented using hardware, software or a combination thereof and may be implemented in one or more computer systems or other processing systems. However, the manipulations performed by these example embodiments were often referred to in terms, such as entering, which are commonly associated with mental operations performed by a human operator. No such capability of a human operator is necessary in any of the operations described herein. Rather, the operations may be completely implemented with machine operations. Useful machines for performing the operation of the example embodiments presented herein include general purpose digital computers or similar devices.

From a hardware standpoint, components in an M/H DTV transmission system typically includes one or more components, such as one or more microprocessors, for performing the arithmetic and/or logical operations required for program execution, and storage media, such as one or more disk drives or memory cards (e.g., flash memory) for program and data storage, and a random access memory, for temporary data and program instruction storage. From a software standpoint, a processor typically includes software resident on a storage media (e.g., a disk drive or memory card), which, when executed, directs the processor in performing transmission and reception functions. The processor software may run on an operating system stored on the storage media, such as, for example, UNIX or Windows (e.g., NT, XP, Vista), Linux, and the like, and can adhere to various protocols such as the Ethernet, ATM, TCP/IP protocols and/or other connection or connectionless protocols. As is well known in the art, processors can run different operating systems, and can contain different types of software, each type devoted to a different function, such as handling and managing data/information from a particular source, or transforming data/information from one format into another format. It should thus be clear that the embodiments described herein are not to be construed as being limited for use with any particular type of server computer, and that any other suitable type of device for facilitating the exchange and storage of information may be employed instead.

Software embodiments of the example embodiments presented herein may be provided as a computer program product, or software, that may include an article of manufacture on a machine accessible or machine readable medium having instructions. The instructions on the machine accessible or machine readable medium may be used to program a computer system or other electronic device (e.g., computer-readable medium). The machine-readable medium may include, but is not limited to, floppy diskettes, optical disks, CD-ROMs, and magneto-optical disks or other type of media/machine-readable medium suitable for storing or transmitting electronic instructions. The techniques described herein are not limited to any particular software configuration. They may find applicability in any computing or processing environment. The terms "machine accessible medium", "machine readable medium" or "computer-readable medium" used herein shall include any medium that is capable of storing, encoding, or transmitting a sequence of instructions for execution by the machine and that cause the machine to perform any one of the methods described herein. Furthermore, it is common in the art to speak of software, in one form or another (e.g., program, procedure, process, application, module, unit, logic, and so on) as taking an action or causing a result. Such expressions are merely a shorthand way of stating that the execution of the software by a processing system causes the processor to perform an action to produce a result.

While various example embodiments of the present invention have been described above, it should be understood that they have been presented by way of example, and not limitation. It will be apparent to persons skilled in the relevant art(s) that various changes in form and detail can be made therein. Thus, the present invention should not be limited by any of the above described example embodiments, but should be defined only in accordance with the following claims and their equivalents.

In addition, it should be understood that the FIGS. 1-16 are presented for example purposes only. The architecture of the example embodiments presented herein is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the example embodiments presented herein in any way. It is also to be understood that the procedures recited in the claims need not be performed in the order presented.

What is claimed is:

1. A method for performing data frame synchronization, comprising the steps of:
   replacing a predetermined number of bytes to be transmitted onto a studio-transmitter link with a plurality of bytes containing signalling information;
   transmitting the predetermined number of bytes in a transport stream over the studio-to transmitter link;
   assigning a packet identifier to a predetermined number of transport stream packets, the packet identifier being unknown to a post processor on the studio-transmitter link;
   calculating a first checksum on the plurality of bytes containing the signalling information; and
   transmitting the first checksum onto the studio-transmitter link to the post-processor.

2. The method according to claim 1, further comprising:
   resetting the plurality of bytes containing signalling information with dummy bytes at a post-processor.

3. The method according to claim 1, wherein the signalling information includes a sub-frame number and a slot number.

4. The method according to claim 1, further comprising:
   receiving the transport stream from the studio-transmitter link;
   parsing the transport stream to obtain the packet identifier of each transport stream packet;
   searching for a predetermined number of consecutive transport stream packets having the same packet identifier;
   calculating a second checksum of a portion of the predetermined number of transport stream packets;
   comparing the first checksum and the second checksum;
   extracting the signalling information if the first checksum and the second checksum are the same; and
   using the signalling information obtained from said extracting to perform frame synchronization.

5. A method for performing data frame synchronization, comprising the steps of:
   replacing a predetermined number of bytes to be transmitted onto a studio-transmitter link with a plurality of bytes containing signalling information;
   transmitting the predetermined number of bytes in a transport stream over the studio-to transmitter link;
   assigning a packet identifier to a predetermined number of transport stream packets, the packet identifier being pre-stored in a memory of a post processor on the studio-transmitter link;
   calculating a first checksum on the plurality of bytes containing the signalling information; and
   transmitting the first checksum onto the studio-transmitter link to the post-processor.

6. The method according to claim 5, further comprising:
receiving the transport stream from the studio-transmitter link;
parsing the transport stream to obtain the packet identifier of each transport stream packet;
searching for the predetermined number of transport stream packets having the packet identifier prestored in the memory;
calculating a second checksum of a portion of the predetermined number of transport stream packets;
comparing the first checksum and the second checksum;
extracting the signalling information if the first checksum and the second checksum are the same; and
using the signalling information obtained from said extracting to perform frame synchronization.

7. A system for performing data frame synchronization, comprising:
a group formatter operable to replace a predetermined number of bytes to be transmitted onto a studio-transmitter link with a plurality of bytes containing signalling information;
a packet transmitter operable to transmit the predetermined number of bytes in a transport stream over the studio-to transmitter link;
a multiplexer operable to assigning a packet identifier to a predetermined number of transport stream packets, the packet identifier being unknown to a post processor on the studio-transmitter link;
a checksum calculator operable to calculate a first checksum on the plurality of bytes containing the signalling information; and
the packet transmitter further operable to transmit the first checksum onto the studio-transmitter link to the post-processor.

8. The system according to claim 7, wherein the plurality of bytes containing signalling information are reset with dummy bytes at a post-processor.

9. The system according to claim 7, wherein the signalling information includes a sub-frame number and a slot number.

10. The system according to claim 7, further comprising:
a packet receiver operable to receive the transport stream from the studio-transmitter link;
a processor operable to:
parse the transport stream to obtain the packet identifier of each transport stream packet,
search for a predetermined number of consecutive transport stream packets having the same packet identifier,
calculate a second checksum of a portion of the predetermined number of transport stream packets,
compare the first checksum and the second checksum,
extract the signalling information if the first checksum and the second checksum are the same, and
use the signalling information to perform frame synchronization.

11. A system for performing data frame synchronization, comprising:
a group formatter operable to replace a predetermined number of bytes to be transmitted onto a studio-transmitter link with a plurality of bytes containing signalling information;
a packet transmitter operable to transmit the predetermined number of bytes in a transport stream over the studio-to transmitter link;
a multiplexer operable to assign a packet identifier to a predetermined number of transport stream packets, the packet identifier being prestored in a memory of a post processor on the studio-transmitter link;
a checksum calculator operable to calculate a first checksum on the plurality of bytes containing the signalling information; and
the packet transmitter further operable to transmitting the first checksum onto the studio-transmitter link to the post-processor.

12. The system according to claim 11, further comprising:
a packet receiver operable to receive the transport stream from the studio-transmitter link;
a processor operable to:
parse the transport stream to obtain the packet identifier of each transport stream packet,
search for the predetermined number of transport stream packets having the packet identifier prestored in the memory,
calculate a second checksum of a portion of the predetermined number of transport stream packets,
compare the first checksum and the second checksum,
extract the signalling information if the first checksum and the second checksum are the same, and
use the signalling information to perform frame synchronization.

13. A non-transitory computer-readable medium having stored thereon sequences of instructions, the sequences of instructions including instructions which when executed by a computer system causes the computer system to perform:
replacing a predetermined number of bytes to be transmitted onto a studio-transmitter link with a plurality of bytes containing signalling information;
transmitting the predetermined number of bytes in a transport stream over the studio-to transmitter link;
assigning a packet identifier to a predetermined number of transport stream packets, the packet identifier being unknown to a post processor on the studio-transmitter link;
calculating a first checksum on the plurality of bytes containing the signalling information; and
transmitting the first checksum onto the studio-transmitter link to the post-processor.

14. The computer-readable medium according to claim 13, further having stored thereon a sequence of instructions which when executed by the computer system causes the computer system to perform:
resetting the plurality of bytes containing signalling information with dummy bytes at a post-processor.

15. The computer-readable medium according to claim 13, wherein the signalling information includes a sub-frame number and a slot number.

16. The computer-readable medium according to claim 13, further having stored thereon a sequence of instructions which when executed by the computer system causes the computer system to perform:
receiving the transport stream from the studio-transmitter link;
parsing the transport stream to obtain the packet identifier of each transport stream packet;
searching for a predetermined number of consecutive transport stream packets having the same packet identifier;
calculating a second checksum of a portion of the predetermined number of transport stream packets;
comparing the first checksum and the second checksum;
extracting the signalling information if the first checksum and the second checksum are the same; and
using the signalling information obtained from said extracting to perform frame synchronization.

17. The non-transitory computer-readable medium having stored thereon a sequence of instructions which when executed by the computer system causes the computer system to perform:

- replacing a predetermined number of bytes to be transmitted onto a studio-transmitter link with a plurality of bytes containing signalling information;
- transmitting the predetermined number of bytes in a transport stream over the studio-to transmitter link;
- assigning a packet identifier to a predetermined number of transport stream packets, the packet identifier being prestored in a memory of a post processor on the studio-transmitter link;
- calculating a first checksum on the plurality of bytes containing the signalling information; and
- transmitting the first checksum onto the studio-transmitter link to the post-processor.

18. The computer-readable memory according to claim 17, further having stored thereon a sequence of instructions which when executed by the computer system causes the computer system to perform:

- receiving the transport stream from the studio-transmitter link;
- parsing the transport stream to obtain the packet identifier of each transport stream packet;
- searching for the predetermined number of transport stream packets having the packet identifier prestored in the memory;
- calculating a second checksum of a portion of the predetermined number of transport stream packets;
- comparing the first checksum and the second checksum;
- extracting the signalling information if the first checksum and the second checksum are the same; and
- using the signalling information obtained from said extracting to perform frame synchronization.

* * * * *